(12) United States Patent
Kimura

(10) Patent No.: US 8,443,837 B2
(45) Date of Patent: May 21, 2013

(54) COUPLING DEVICE

(75) Inventor: Seiji Kimura, Hyogo (JP)

(73) Assignee: Pascal Engineering Corporation, Hyogo (JP)

( * ) Notice: Subject to any disclaimer, the term of this patent is extended or adjusted under 35 U.S.C. 154(b) by 780 days.

(21) Appl. No.: 12/451,311

(22) PCT Filed: May 30, 2007

(86) PCT No.: PCT/JP2007/000584
§ 371 (c)(1),
(2), (4) Date: Nov. 5, 2009

(87) PCT Pub. No.: WO2008/146335
PCT Pub. Date: Dec. 4, 2008

(65) Prior Publication Data
US 2010/0096032 A1    Apr. 22, 2010

(51) Int. Cl.
*F16L 37/32*    (2006.01)

(52) U.S. Cl.
USPC ........ 137/614.04; 425/3; 425/192 R; 425/589

(58) Field of Classification Search
USPC ............. 137/614.01, 614.03, 614.04, 614.06, 137/614, 614.02, 614.05; 24/603; 251/149.6, 251/149.7, 149.9; 425/3, 192 R, 589
See application file for complete search history.

(56) References Cited

U.S. PATENT DOCUMENTS

| | | | | |
|---|---|---|---|---|
| 4,809,747 A | * | 3/1989 | Choly et al. | 137/614.06 |
| 4,852,611 A | * | 8/1989 | Knerr et al. | 137/614.04 |
| 4,955,779 A | * | 9/1990 | Knackstedt | 137/614.04 |
| 4,971,107 A | * | 11/1990 | Yonezawa | 137/614.03 |
| 5,016,671 A | * | 5/1991 | Barwise | 137/614.04 |
| 5,462,084 A | * | 10/1995 | Arisato | 137/614.03 |
| 6,390,126 B1 | | 5/2002 | Kimura | |
| 7,654,285 B2 | * | 2/2010 | Stark | 137/614.03 |
| 7,871,255 B2 | * | 1/2011 | Kimura | 425/3 |
| 8,031,038 B2 | * | 10/2011 | Kimura | 335/285 |
| 8,047,826 B2 | * | 11/2011 | Kimura | 425/3 |
| 2010/0092587 A1 | * | 4/2010 | Kimura | 425/3 |

FOREIGN PATENT DOCUMENTS

| | | |
|---|---|---|
| JP | 63-116829 | 5/1988 |
| JP | 5-038740 | 2/1993 |
| JP | 6-19930 | 3/1994 |
| JP | 2000-346266 | 12/2000 |
| JP | 2003-326531 | 11/2003 |

* cited by examiner

*Primary Examiner* — Craig Schneider
*Assistant Examiner* — Craig J Price
(74) *Attorney, Agent, or Firm* — Jordan and Hamburg LL

(57) ABSTRACT

A coupling device which contributes to a further reduction in the space required to transport a die etc., in which first and second joints are simplified in structure and downsized, and that is advantageous when multiple sets of such first and second joints are installed. The coupling device comprises a female joint and a male joint. The female joint is fitted on a mold and comprises a first valve casing, a first valve body, and a first open/close valve having a first valve seat and a first valve portion. The male joint is fitted on a clamping plate of an injection molding machine and comprises a second valve casing, a second valve body, and a second open/close valve having a second valve seat and a second valve portion. The coupling device further comprises a valve body drive unit. When, in a condition where the front ends of the first and second valve casings and are in contact with each other, the valve body drive unit drives and advances, in the male joint, only the second valve body relative to the second valve casing, the first and second valve bodies and are driven to the valve opening side.

13 Claims, 18 Drawing Sheets

COUPLING DEVICE

BACKGROUND OF THE INVENTION

The present invention relates to a coupling device comprising a female joint and a male joint capable of connecting/disconnecting the first and second fluid passages in first and second members.

The prior art put into practical use a coupling device comprising a first joint fitted on a first member such as a mold and work palette and a second joint fitted on a second member such as a mold fixture of a molding machine and a base member of a machining tool, when coupling/decoupling the first and second members in a predetermined positional relationship, for connecting/disconnecting the first and second fluid passages via the first and second joints in order to supply a fluid (cooling water, pressurized fluid, and so on) from one of the first and second fluid passages in the first and second members to the other while the first and second members are coupled (for example see the Patent Document 1).

The first and second joints consist of male and female joints, respectively, each having an open/close valve. The open/close valves of the male and female joints are closed while the male and female joints are separated. On the other hand, when the male and female joints are connected, the leading end portion of the male joint is inserted in the female joint and the leading end portion of the female joint is inserted in the leading end portion of the male joint so as to open the open/close valves of the male and female joints, whereby the first and second fluid passages are connected. In such a coupling device, the male and female joints generally protrude outward from the first and second members.

In the coupling device of the Patent Document 1, the male joint is fitted on a work pallet downward and the female joint is fitted on a base member of a machining tool upward. The male joint has a casing member fixed to the work pallet, a valve casing fitted in the casing member and protruding downward from the casing member, and a shaft-like valve body fitted in the valve casing movably in the advancing/retreating direction. The open/close valve is constituted by a valve seat and a valve portion provided at the lower ends of the valve casing and valve body.

A hydraulic cylinder for driving the female joint upward is provided to the base member of the machining tool. The female joint has a main body case fitted in the cylinder barrel of the hydraulic cylinder movably in the advancing/retreating direction and protruding upward from the cylinder barrel, a cylindrical member mounted in the main body case movably in the advancing/retreating direction, and a shaft-like valve body provided inside the cylindrical member and fixed to the body casing at the lower end. The open/close valve is constituted by a valve seat and a valve portion provided at the upper ends of the cylindrical member and valve body.

For connecting the separated male and female joints, the female joint is driven upward by the hydraulic cylinder while the male and female joints face each other one above the other. Here, first, the main body case, cylindrical member, and valve body of the female joint are moved upward together. The cylindrical member stops moving upward when its upper end abuts on the lower end of the valve casing of the male joint. Then, the main body case and valve body move upward together. Then, the valve body of the female joint is inserted in the valve casing of the male joint so that the valve body of the male joint is moved upward. The valve casing of the male joint is inserted in the main body case of the female joint so that the cylindrical member is moved downward in relation to the body casing and valve body in the female joint, whereby the open/close valves of the female and male joints are opened.

Patent Document 1: Japanese Laid-Open Patent Publication No. 2000-346266.

SUMMARY OF THE INVENTION

For example, in order to attach/detach a mold to the mold fixture of a horizontal injection molding machine, the mold is moved in parallel to the fixing surface of the mold fixture. In doing so, there is a demand that the space between the mold and mold fixture is minimized to save the conveyance space. However, when a conventional clamping member is used to fix a mold to the fixing surface of the mold fixture, the clamping member attached to the fixing surface becomes an obstacle. Then, a possible solution is to also attach/detach the clamping member when a mold is attached/detached to/from the mold fixture. In this way, the workload of attaching/detaching a mold to/from the mold fixture is increased.

Then, multiple magnets are installed in the mold fixture and the mold fixture is alternatively switched between the active state in which a magnetic adsorption force is generated and the inactive state in which a magnetic adsorption force is not generated. In this way, the mold can be fixed to the fixing surface of the mold fixture without using a conventional clamping member, whereby the above problem with conventional clamping members can be eliminated. However, as in the case of using a conventional clamping member, when a male joint and a female joint are fitted on the mold and mold fixture to constitute a coupling device and the male and female joints protrude outward from the first and second members as in the Patent Document 1, the space between the mold and mold fixture should be increased for the protrusion while the mold is conveyed to attach/detach it to/from the mold fixture. It is difficult to fulfill the demand of saving the conveyance space.

In the prior art coupling device, as in the Patent Document 1, when the female joint has a hydraulic cylinder driving the entire female joint including the main body case, cylindrical member with a valve seat, and valve body with a valve portion as the valve body drive means for driving the valve bodies of the male and female joints to the opening positions in order to connect the male and female joints, the hydraulic cylinder must have a cylinder barrel housing the entire female joint and, therefore, is increased in size. For this reason, the female joint structure including the female joint and hydraulic cylinder is increased in size. The space for fitting such a female joint structure may not be reserved on an existing mold, work pallet, mold fixture of a molding machine, base member of a machining tool, etc.

For operating the coupling device, the male joint should protrude from the first member but the female joint does not necessarily protrude from the second member while the male and female joints are not connected. However, because the female joint structure is increased in size as suggested with regard to the above problem, the female joint may have to protrude from the second member and, therefore, it is difficult to achieve any improvement in saving the conveyance space. In addition, the female joint has a complex structure because of the main body case and accompanying members besides the cylindrical member having a valve seat and the valve body having a valve portion, which contributes to the female joint structure being increased in size.

Furthermore, for example, there is a demand for installation of multiple sets of male and female joints on the mold and the mold fixture of an injection molding machine in order to provide multiple lines of coolant passages in the mold. In such a case, each one of the multiple female joints needs a hydraulic cylinder and each female joint structure is increased in size; the entire coupling device is significantly increased in size. Therefore, the multiple sets of male and female joints may not be provided in a proper arrangement. Furthermore, the total weight of multiple female joint structures and members for fitting them is increased and the workload of moving them is increased.

The object of the present invention is to provide a coupling device in which the space for conveying a mold is further saved, the first and second joints are simplified in structure and downsized, and multiple sets of first and second joints are advantageously provided.

The coupling device comprises a female joint having a first open/close valve and a male joint having a second open/close valve for connecting/disconnecting the first and second fluid passages in first and second members, wherein the female joint comprises a first valve casing fitted in a first fitting hole formed in the first member and having a first valve seat in a leading end portion, a first valve body fitted in the first valve casing movably in an advancing/retreating direction and having in a leading end portion a first valve portion abutting on the first valve seat from an inside, and a first biasing means for biasing the first valve body toward a closing position; the male joint comprises a second valve casing fitted in a second fitting hole formed in the second member and having a second valve seat in a leading end portion, a second valve body fitted in the second valve casing movably in an advancing/retreating direction and having in a leading end portion a second valve portion abutting on the second valve seat from an outside, and a second biasing means for biasing the second valve body toward a closing position; a surface of the first member and a leading end face of the first valve casing of the female joint are substantially flush with each other and a surface of the second member and a leading end face of the second valve casing of the male joint are substantially flush with each other; and a valve body drive means for driving the first and second valve bodies to opening positions while leading ends of the first and second valve casings abut on each other is provided.

Furthermore, one of the first and second members consists of a mold or a joint fitting member (a first joint fitting member) fixed to the mold in the invention. In the invention, the other of the first and second members consists of a clamping plate for fixing the mold in a molding machine, the clamping plate having multiple magnets installed for generating a magnetic adsorption force and being alternatively switched between an active state in which the magnetic adsorption force is generated and an inactive state in which the magnetic adsorption force is not generated. In the invention according to some embodiments, the other of the first and second members consists of a second joint fitting member fixed to a clamping plate. In the invention according to some embodiments the other of the first and second members consists of a platen for fixing the mold in a molding machine, the platen having multiple magnets installed for generating a magnetic adsorption force and being alternatively switched between an active state in which the magnetic adsorption force is generated and an inactive state in which the magnetic adsorption force is not generated. In the invention according to claim 4, some embodiments the other of the first and second members consists of a second joint fitting member fixed to a platen.

In the coupling device 4, when the female and male joints are separated, the first valve portion of the first valve body biased by the first biasing means toward the closing position abuts on and is pushed to the first valve seat of the first valve casing from the inside so that the first open/close valve is closed in the female joint and the second valve portion of the second valve body biased by the second biasing means toward the closing position abuts on and is pushed to the second valve seat of the second valve casing from the outside so that the second open/close valve is closed in the male joint. For connecting the separated female and male joints, first, the leading ends of the first and second valve casings are brought to abut on each other. Here, the leading ends of the first and second valve casings can abut on each other when the first and second members are coupled in a predetermined positional relationship. Alternatively, the leading ends of the first and second valve casings can abut on each other when the second valve casing and second valve body of the male joint or the first valve casing and first valve body of the female joint are advanced together after the first and second valve casings closely face each other. Then, while the leading ends of the first and second valve casings abut on each other, the valve body drive means drives the first and second valve bodies to the opening positions against the biasing forces of the first and second biasing means, whereby the first and second open/close valves are opened to connect the female and male joints and connect the first and second fluid passages in the first and second members.

The clamping plate or platen of a molding machine has multiple magnets installed for generating a magnetic adsorption force and is alternatively switched between the active state in which the magnetic adsorption force is generated and the inactive state in which the magnetic adsorption force is not generated, whereby the mold can be fixed to the clamping plate or platen without using a conventional clamping member. Furthermore, the surface of the first member and the leading end face of the first valve casing of the female joint are substantially flush with each other and the surface of the second member and the leading end face of the second valve casing of the male joint are substantially flush with each other, whereby the mold can be moved in parallel to the fixing surface of the clamping plate or platen in conveying the mold for attaching/detaching it to/from the clamping plate or platen with the minimized space between the mold and clamping plate or between the mold and platen, saving the conveyance space.

The following structures are included in various embodiments.

(1) The valve body drive means advances only the second valve body in relation to the second valve casing in the male joint so as to drive the first and second valve bodies to the opening positions while the leading ends of the first and second valve casings abut on each other.

(2) The valve body drive means has a piston part provided integrally with the second valve body of the male joint, a fluid pressure operation chamber applying a fluid pressure to the piston part, and a fluid pressure supply means for supplying the fluid pressure to the fluid pressure operation chamber.

(3) Multiple sets of the female and male joints are provided and the fluid pressure supply means is shared by the multiple sets of female and male joints.

(4) The first valve casing of the female joint is fitted in the first fitting hole movably in the retreating direction and a first valve casing biasing means for biasing the first valve casing outward is provided.

(5) The second valve casing of the male joint is fitted in the second fitting hole movably in the advancing direction, a second valve casing biasing means for biasing the second valve casing in the retreating directions is provided, and when a fluid pressure is supplied to the fluid pressure operation chamber while the first and second valve casings closely face each other, the second valve casing and second valve body are advanced together so that the leading ends of the first and second valve casings abut on each other and, then, the second valve body is advanced in relation to the second valve casing.

(6) The second valve seat of the male joint consists of an annular sealing member fitted on the leading end of the second valve casing and the annular sealing member is capable of abutting on the leading end of the first valve casing of the female joint.

(7) The valve body drive means is capable of advancing the second valve body so as to drive the first and second valve bodies to the opening positions and connect the female and male joints while the leading ends of the first and second valve casings abut on each other with the axes of the female and male joints being shifted within a predetermined range.

(8) The molding machine is a horizontal injection molding machine.

The coupling device, particularly, one of the first and second members consists of a mold or a first joint fitting member fixed to the mold and the other consists of a clamping plate for locking the mold in a molding machine, the clamping plate having multiple magnets installed for generating a magnetic adsorption force and being alternatively switched between the active state in which the magnetic adsorption force is generated and the inactive state in which the magnetic adsorption force is not generated, whereby the mold can be fixed to the clamping plate without using a conventional clamping member. Furthermore, the surface of the first member and the leading end face of the first valve casing of the female joint are substantially flush with each other and the surface of the second member and the leading end face of the second valve casing of the male joint are substantially flush with each other, whereby the mold can be moved in parallel to the fixing surface of the clamping plate in conveying the mold for attaching/detaching it to/from the clamping plate with the minimized space between the mold and clamping plate, achieving improvement in saving the conveyance space. Additionally, the female and male joints can simply and securely be connected/disconnected and the workload of attaching/detaching the mold to/from the clamping plate can significantly be reduced.

In the coupling device one of the first and second members consists of a mold or a first joint fitting member fixed to the mold and the other consists of a second joint fitting member fixed to a clamping plate for fixing the mold in a molding machine, the second joint fitting member being fixed to the clamping plate having multiple magnets installed for generating a magnetic adsorption force and alternatively switched between the active state in which the magnetic adsorption force is generated and the inactive state in which the magnetic adsorption force is not generated. Additionally, the male or female joint can easily be provided by fixing the second joint fitting member to an existing clamping plate, thereby improving versatility.

The coupling device, particularly, one of the first and second members consists of a mold or a joint fitting member fixed to the mold and the other consists of a platen for fixing the mold in a molding machine, the platen having multiple magnets installed for generating a magnetic adsorption force and being alternatively switched between the active state in which the magnetic adsorption force is generated and the inactive state in which the magnetic adsorption force is not generated, whereby the mold can be fixed to the platen without using a conventional clamping member. Furthermore, the surface of the first member and the leading end face of the first valve casing of the female joint are substantially flush with each other and the surface of the second member and the leading end face of the second valve casing of the male joint are substantially flush with each other, whereby the mold can be moved in parallel to the fixing surface of the platen in conveying the mold for attaching/detaching it to/from the platen with the minimized space between the mold and platen, achieving improvement in saving the conveyance space. Additionally, the female and male joints can simply and securely be connected/disconnected and the workload of attaching/detaching the mold to/from the platen can significantly be reduced. In addition, the clamping plate can be eliminated; therefore, the molding machine can be simplified in structure and the molten resin injection path for injecting molten resin into the cavities of the molds from the back of the platen can be shortened as the clamping plate is eliminated, whereby the molten resin in a proper molten state can be injected into the cavities of the molds, increasing the accuracy of injection molding.

In the coupling device one of the first and second members consists of a mold or a first joint fitting member fixed to the mold and the other consists of a second joint fitting member fixed to a platen for fixing the mold in a molding machine, the second joint fitting member being fixed to the platen having multiple magnets installed for generating a magnetic adsorption force and alternatively switched between the active state in which the magnetic adsorption force is generated and the inactive state in which the magnetic adsorption force is not generated. Additionally, the male or female joint can easily be provided by fixing the second joint fitting member to the platen, thereby improving versatility.

In the coupling device the valve body drive means advances only the second valve body in relation to the second valve casing in the male joint so as to drive the first and second valve bodies to the opening positions while the leading ends of the first and second valve casings abut on each other, whereby the female and male joints can be simplified in structure and downsized. In addition, as for the male joint, a simple and small fluid pressure cylinder can be used for advancing the second valve body in relation to the second valve casing by means of the valve body drive unit, whereby the male joint structure including the male joint and fluid pressure cylinder can be simplified and downsized.

Hence, the space for fitting the female joint or male joint (male joint structure) can be assured on an existing mold or a joint fitting member (first joint fitting member) fixed to a mold, a clamping plate or platen of a molding machine, or a second joint fitting member fixed to the clamping plate or platen. Furthermore, the valve body drive means drives only the first and second valve bodies to open the first and second open/close valves while the leading ends of the first and second valve casings abut on each other. Therefore, the intended behavior of the coupling device is assured in the configuration in which the surface of the first member and the leading end face of the first valve casing of the female joint are substantially flush with each other and the surface of the second member and the leading end face of the second valve casing of the male joint are substantially flush with each other.

The female joint and male joint (male joint structure) can be downsized and multiple sets of female and male joints are properly arranged in the case of providing multiple sets of male and female joints on the first and second members. Furthermore, the total weight of the first member and multiple female joints will not excessively be increased; therefore, increase in the workload of moving them can be suppressed. The total weight of the second member and multiple male joints (mal joint structure) will not excessively be increased; therefore, increase in the workload of moving them can be suppressed.

In the coupling device the valve body drive means has a piston part provided integrally with the second valve body of the male joint, a fluid pressure operation chamber applying a fluid pressure to the piston part, and a fluid pressure supply means for supplying the fluid pressure to the fluid pressure operation chamber, whereby the valve body drive means securely advances the second valve body in relation to the second valve casing. Furthermore, the piston part is provided integrally with the second valve body and the fluid pressure operation chamber can have a simplified structure and easily be provided, whereby the male joint structure can certainly be simplified and downsized.

In the coupling device multiple sets of the female and male joints are provided and the fluid pressure supply means is shared by the multiple sets of female and male joints, whereby it is unnecessary to provide as many fluid pressure supply devices as the number of female joints and, therefore, the coupling device can be simplified in structure.

In the coupling device the first valve casing of the female joint is fitted in the first fitting hole movably in the retreating direction and a first valve casing biasing means for biasing the first valve casing outward is provided, whereby errors in manufacturing the female and male joints and errors in assembling them to the first and second members are absorbed when the mold is fixed to the clamping plate or platen, ensuring that the leading ends of the first and second valve casings abut on each other.

In the coupling device the second valve casing of the male joint is fitted in the second fitting hole movably in the advancing direction, a second valve casing biasing means for biasing the second valve casing in the retreating direction is provided, and, when a fluid pressure is applied to the fluid pressure operation chamber while the first and second valve casings closely face each other, the second valve casing and second valve body are advanced together so that the leading ends of the first and second valve casings abut on each other and, then, the second valve body is advanced in relation to the second valve casing, whereby prior to connecting the female and male joints, the mold is fixed to the clamping plate or platen so that the first and second valve casings closely face each other and, then, the leading ends of the first and second valve casings are brought to securely abut on each other and the female and male joints are securely connected.

In the coupling device the second valve seat of the male joint consists of an annular sealing member fitted on the leading end of the second valve casing and the annular sealing member is capable of abutting on the leading end of the first valve casing of the female joint, whereby this single annular sealing member constitutes the second valve seat of the male joint and ensures that the leading ends of the first and second valve casing abut on each other in a sealed manner. Hence, the male joint can be simplified in structure (reduced in the number of parts) while these two functions are ensured.

In the coupling device the valve body drive means is capable of advancing the second valve body so as to drive the first and second valve bodies to the opening positions and connect the female and male joints while the leading ends of the first and second valve casings abut on each other with the axes of the female and male joints being shifted within a predetermined range, whereby the valve body drive means can securely drive the first and second valve bodies to the opening positions to connect the female and male joints while errors in positioning the mold on the clamping plate or platen and errors in assembling the female and male joints are tolerated.

In the coupling device the molding machine is a horizontal injection molding machine, whereby the demand for moving a mold in parallel to the fixing surface of a clamping plate or platen in conveying the mold for fixing it to the clamping plate or platen in a horizontal injection machine can be fulfilled with improvement in saving the conveyance space since the space between the mold and clamping plate or between the mold and platen can be minimized.

DESCRIPTION OF NUMERALS

Figure 1:
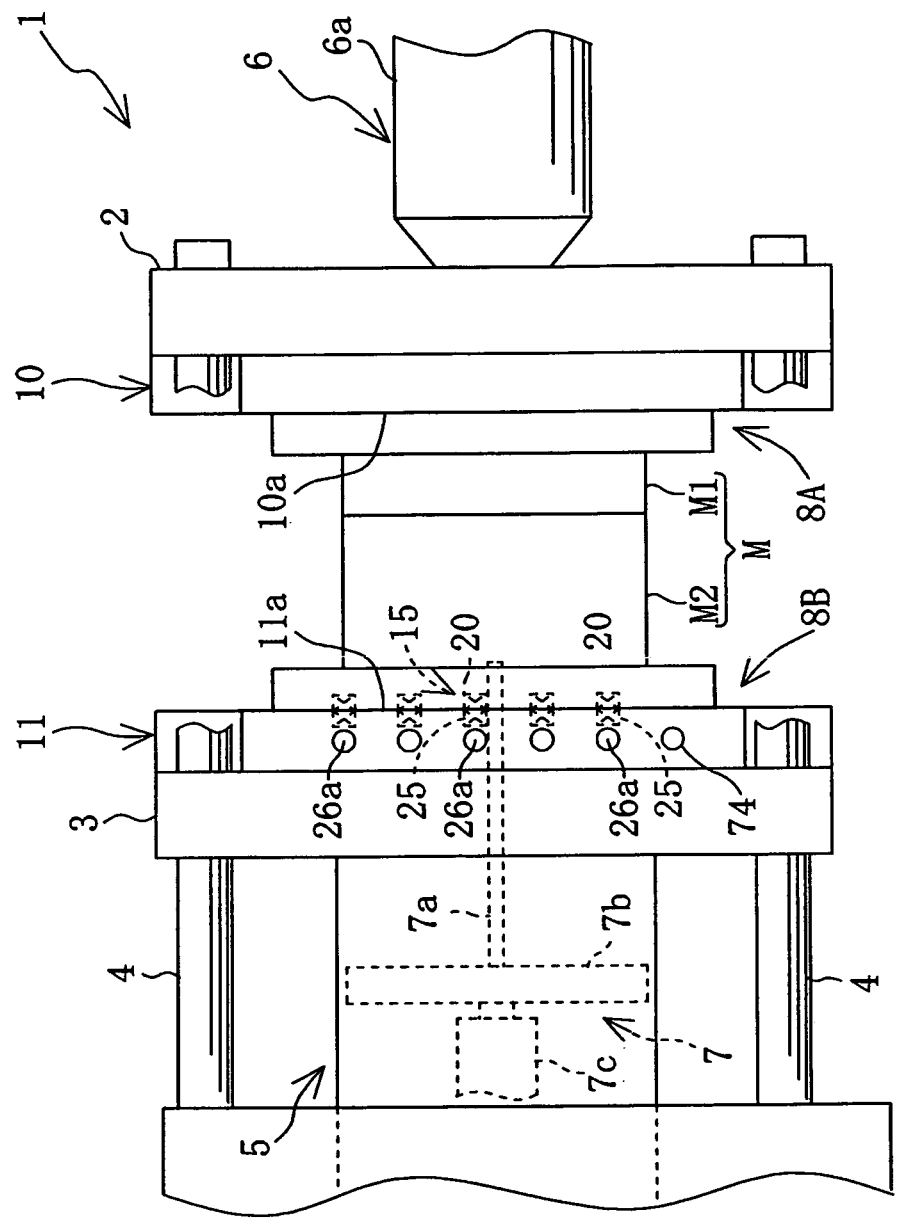
FIG. 1 is a side view of a horizontal injection molding machine of embodiment 1.

M2 mold
1, 1A horizontal injection molding machine
2, 2A fixed platen
3, 3A movable platen
11 clamping plate
15, 100, 180, 190 coupling device
20, 110 female joint
21, 111 first fluid passage
22, 112 first fitting hole
25, 115 male joint
26, 116 second fluid passage 27, 117 second fitting hole
30, 120 first valve casing
31, 121 first valve seat
34 compression coil spring
35, 125 first valve body
36, 126 first valve portion
40, 130 compression coil spring
45, 135 first open/close valve
50, 145 second valve casing
51, 146 second valve seat
55, 150 second valve body
55a, 150a piston part
56, 151 second valve portion
60, 155 compression coil spring
61, 166 annular sealing member
65, 160 second open/close valve
70, 170 valve body drive unit
71, 171 fluid pressure operation chamber
72, 172 fluid pressure supply unit
101 joint fitting member
165 compression coil spring

DETAILED DESCRIPTION OF THE PREFERRED EMBODIMENTS

The coupling device of the present invention comprises a female joint and a male joint, each comprising a valve casing, a valve body, and an open/close valve, and a valve body drive means for driving the valve bodies of the female and male joints to the opening positions while the leading ends of the valve casings of the female and male joints abut on each other.

Embodiment 1

In the coupling device of embodiment 1, the female joint is fitted on a mold as the first member and the male joint is fitted on a clamping plate as the second member that is a platen auxiliary for fixing the mold in a horizontal injection molding machine, whereby the first fluid passage in the mold and the second fluid passage in the clamping plate are connected/disconnected when the mold is fixed/unfixed to/from the clamping plate.

First, a horizontal injection molding machine 1 will be explained.

Figure 2:
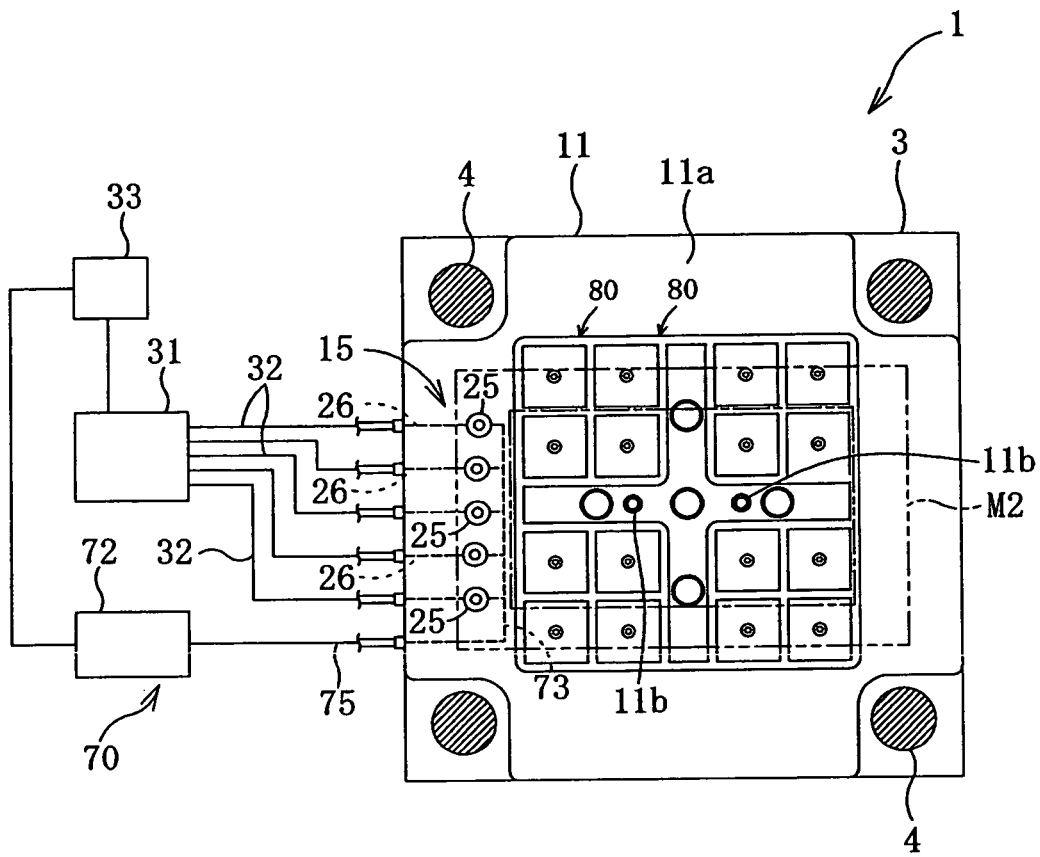
FIG. 2 is an illustration of the surface of the core part including the female joint of the coupling device of embodiment 1.

As shown in FIGS. 1 and 2, the horizontal injection molding machine 1 comprises a fixed platen 2 and a movable platen 3 for fixing a mold M (a fixed mold M1 and a movable mold M2), four guide rods 4 for guiding and supporting the movable platen 3 movably toward/away from the fixed platen 2, a movable platen drive mechanism 5 for driving the movable platen 3 toward/away from the platen 2 for closing/opening the mold M, an injection mechanism 6 for supplying molten synthetic resin in the cavity of the mold M in the closed state, and an eject mechanism 7 for ejecting the molded article from the movable mold M2.

The fixed platen 2 and movable platen 3 are each a square platen. The four guide rods 4 are inserted and fixed in the four corners of the fixed platen 2. They are slidably inserted in the four corners of the movable platen 3. The injection mechanism 6 has an injection cylinder 6a connected to the fixed platen 2. The eject mechanism 7 has one or multiple ejector pins 7a, an ejector plate 7b to which the ejector pins 7a are coupled at the base end, and a fluid pressure cylinder 7c for driving the ejector plate 7b.

The horizontal injection molding machine 1 comprises a clamping device 8A fixing/unfixing the fixed mold M1 and a clamping device 8B fixing/unfixing the movable mold M2.

The clamping devices 8A and 8B each comprise a magnetic clamping device provided with a clamping plate 10 or 11 having multiple magnets installed for generating a magnetic adsorption force and alternatively switched between the active state in which the magnetic adsorption force is generated and the inactive state in which the magnetic adsorption force is not generated. The clamping plates 10 and 11 are fixed to the fixed platen 2 and movable platen 3 and have fixing surfaces 10a and 11a, respectively.

As shown in FIGS. 4 to 7, the clamping plate 11 of the clamping device 8B consists of a steel plate made of magnetic material nearly equal to the movable platen 3 in size, from which nearly square portions corresponding to the four corners of the movable platen 3 are removed. The clamping plate 11 is fixed to the surface of the movable platen 3 and has ejector pin holes 11b formed in the center part. A predetermined number of magnet units 80 are provided on the clamping plate 11 in a predetermined manner. For example, four sets of magnet unit groups (i.e. total of 16 magnet units 80), each group comprising four magnet units 80, arranged next to each other on the top and bottom and right and left and are placed on the clamping plate 11 at positions symmetrical about the center of the clamping plate 11.

The multiple magnetic units 80 are housed in a recess 11c formed in the clamping plate 11 from the fixing surface 11a side. Each magnetic unit 80 has a magnetic steel block 81 facing the fixing surface 11a, an Alnico magnet 82 placed on the back of the steel block 81, a coil 83 wound around the Alnico magnet 82 for switching the polarity of the Alnico magnet 82, and multiple (for example eight) neodymium permanent magnets 84 arranged around the outer periphery of the steel block 81. The permanent magnets 84 between the steel blocks 81 of adjacent magnet units 80 are shared by these magnet units 80.

The steel block 81 and Alnico magnet 82 have a square form. The steel block 81 has a bolt hole 81a and the Alnico magnet has a hole 82a. Interposed between the steel block 81 and the bottom wall 11d of the recess 11c, the Alnico magnet 82 and coil 83 are fastened to the bottom wall 11d of the recess 11c by a hexagon socket head bolt 85 consisting of a non-magnetic material (for example SUS304) inserted in the bolt hole 81a and hole 82a. The multiple permanent magnets 84 are fixed to the clamping plate 11 or steel block 81 by some fixing means.

The polarities of the permanent magnets 84 around the steel block 81 of one of two adjacent magnet units 80 and the polarities of the permanent magnets 84 around the steel block 81 of the other magnet unit 80 are reversed to each other. The polarity of the Alnico magnet 82 can be reversed by magnetic induction of a magnetic field generated by the coil 83. The polarity of the Alnico magnet 82 corresponding to the steel block 81 of one of two adjacent magnet units 80 and the polarity of the Alnico magnet 82 corresponding to the steel block 81 of the other magnet unit 180 are reversed to each other.

Figure 6:
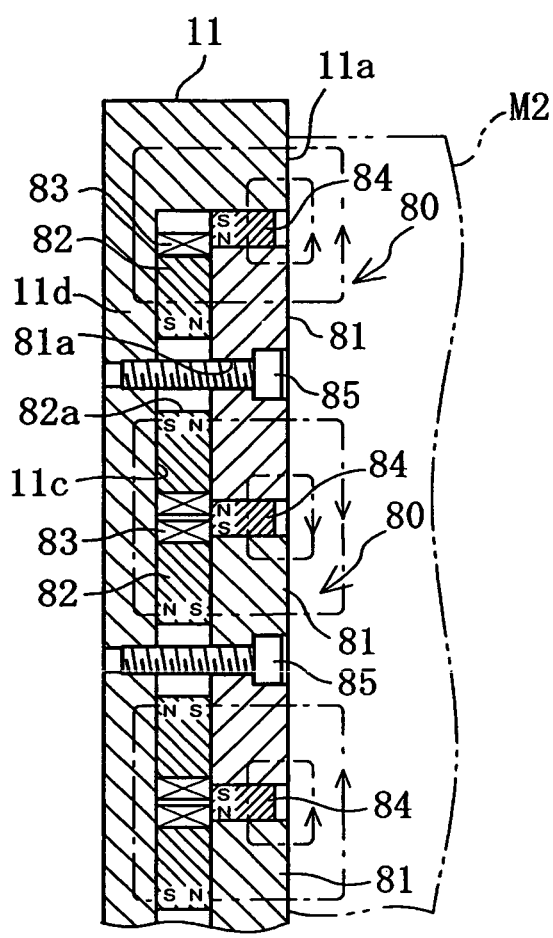
FIG. 6 is a cross-sectional view of the core part of the clamping device of embodiment 1 in the active state.
Figure 7:
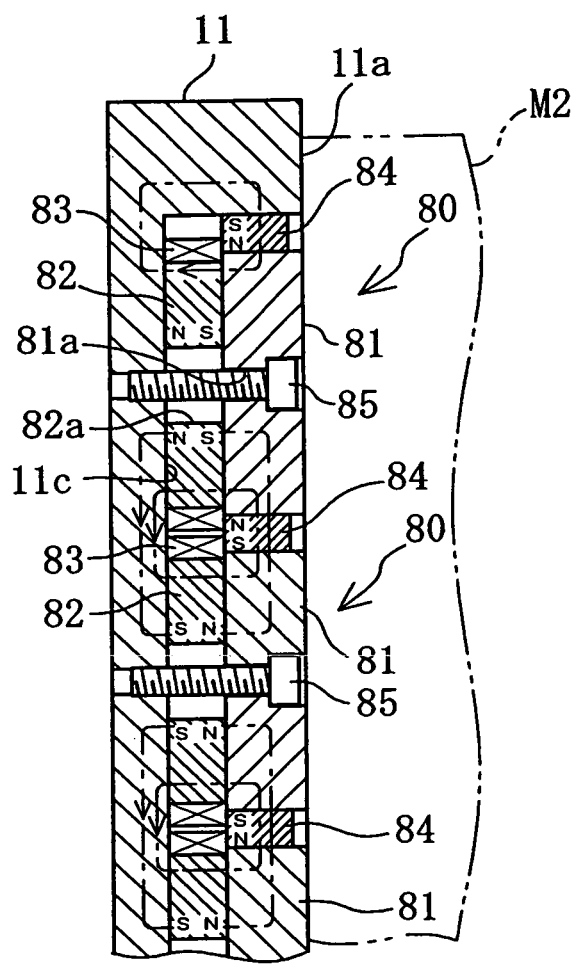
FIG. 7 is a cross-sectional view of the core part of the clamping device of embodiment 1 in the inactive state.

For fixing the mold M2 to the clamping plate 11, first, as shown in FIG. 7, the mold M2 is positioned and placed in contact with the fixing surfaces 11a of the clamping plate 11 in the inactive state in which the magnetic adsorption force is not generated. The coil 83 is energized in a predetermined direction for several seconds so that, as shown in FIG. 6, the polarity of the Alnico magnet 82 is switched and the magnetic flux caused by the Alnico magnet 82 has the same direction as the magnetic flux caused by the permanent magnets 84, whereby a magnetic circuit having a magnetic path partly formed by the mold M2 is established. Then, the active state in which a potent magnetic adsorption force is generated is created and the magnetic adsorption force serves to fix the mold M2 to the clamping plate 11.

For unfixing the mold M2 from the clamping plate 11, the coil 83 is energized in the direction opposite to that for fixing the mold M2 for several seconds so that, as shown in FIG. 7, the polarity of the Alnico magnet 82 is reversed and the magnetic flux caused by the Alnico magnet 82 does not go beyond the fixing surface 11a of the clamping plate 11, whereby the magnetic force does not work on the mold M2, creating the inactive state in which the magnetic adsorption force is not generated. Here, the clamping device 8A has basically the same structure as the clamping device 8B and will not be described in detail. The clamping plate 10 of the clamping device 8A has a locating ring in the center part.

The coupling device 15 will be described hereafter.

Figure 3:
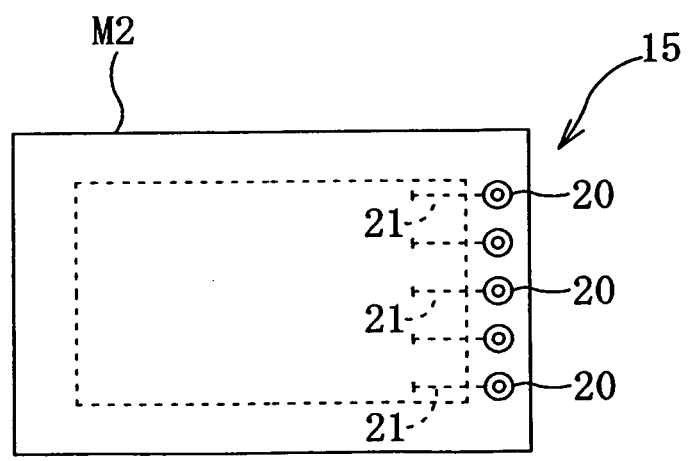
FIG. 3 is an illustration of the surface of the core part including the male joint of the coupling device of embodiment 1.
Figure 4:
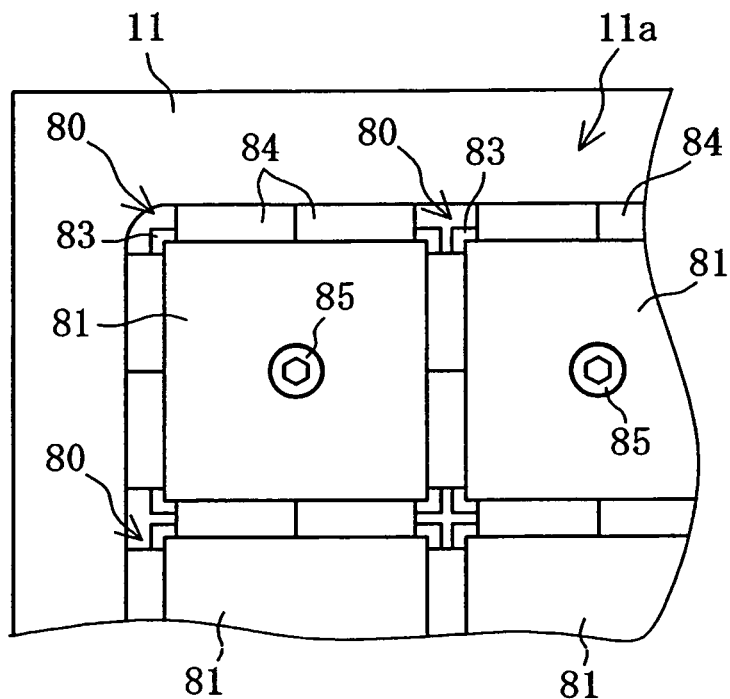
FIG. 4 is an illustration of the surface of the core part of the clamping device of embodiment 1.
Figure 5:
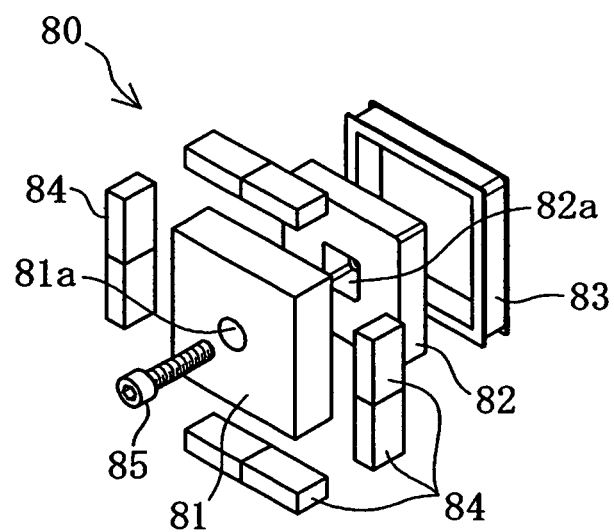
FIG. 5 is an exploded perspective view of the core part of the clamping device of embodiment 1.

As shown in FIGS. 1 to 3, the coupling device 15 comprises multiple (for example five) female joints 20 fitted on the mold M2, and multiple (for example five) male joints 25 fitted on the clamping plate 11 and paired with the female joints 20. Upon fixing/unfixing the mold M2 to/from the clamping plate 11 in a predetermined positional relationship, multiple (for example five) first fluid passages 21 in the mold M2 and multiple (for example five) second fluid passages 26 in the clamping plate 11 can be connected/disconnected through multiple sets of female and male joints 20 and 25.

Here, the clamping plate 11 has multiple fluid ports 26a for the multiple second fluid passages 26. The multiple fluid ports 26a are connected to a fluid supply/discharge unit 31 via multiple fluid hoses 32. A control device 33 controls the fluid supply/discharge unit 31. With the multiple first and second fluid passages 21 and 26 being connected, the fluid supply/discharge unit 31 is driven to supply/discharge a fluid to/from the multiple first fluid passages 21 in the mold M2. For example, the fluid supply/discharge unit 31 comprises a coolant supply/discharge unit and, in such a case, circulates a coolant through the mold M2.

Here, the coupling device 15 can connect/disconnect the multiple first fluid passages 21 in the movable mold M2 and the multiple second fluid passages 26 in the clamping plate 11 as described above. A coupling device capable of connecting/disconnecting the multiple fluid passages in the fixed mold M1 and the multiple fluid passages in the clamping plate 10 can be provided in a similar manner to the coupling device 15.

The female joint 20 and male joint 25 will be described in detail hereafter. The female joint 20 will be described on the premise that the arrow a points to the leading end in FIG. 8 and the male joint 25 will be described on the premise that the arrow b points to the leading end in FIG. 8.

As shown in FIGS. 3 and 8 to 10, the female joint 20 comprises a first valve casing 30 fitted in a first fitting hole 22 formed in the mold M2 and having a first valve seat 31 in the leading end portion, a first valve body 35 fitted in the first valve casing 30 movably in the advancing/retreating direction and having in the leading end portion a first valve portion 36 abutting on the first valve seat 31 from the inside (base end side), and a compression coil spring 40 as the first biasing means for biasing the first valve body 35 toward the closing position (toward the leading end) in relation to the first valve casing 30.

The first fitting hole 22 is circular in cross-section and open on the surface of the mold M2 (the surface facing the fixing surface 11a when the mold M2 is fixed to the clamping plate 11). A fluid passageway 21a of the first fluid passage 21 is connected to the peripheral surface of the first fitting hole 22 and a fluid passageway 21b of the first fluid passage 21 is connected to the base end face of the first fitting hole 22. It is possible to use at least one of the fluid passageways 21a and 21b and omit the fluid passageway 21a or 21b. The aforementioned surface of the mold M2 and the leading end face of the first valve casing 30 are substantially flush with each other and the first valve seat 31 and first valve portion 36 constitute a first open/close valve 45.

The first valve casing 30 has a barrel 30a and a leading protrusion 30b. The leading end portion of the barrel 30a is slidably fitted in the first fitting hole 22 and an annular seal 32 is fitted around the outer periphery of the leading end portion of the barrel 30a. A stop ring 33 is placed on the peripheral surface of the leading end portion of the first fitting hole 22. Engaging with the stop ring 33, the first valve casing 30 does not move toward the leading end. In this state, the leading protrusion 30b slightly protrudes to the leading end from the first fitting hole 22 (for example by 0.3 mm). In this state, the leading end of the leading protrusion 30b can be retreated in the first fitting hole 22 so that the first valve casing 30 is moved in the first fitting hole 22 in the retreating direction.

A passageway 23a is formed in the first valve body 35 and a passage entrance 23b connecting the passageway 23a and the outside is formed in the leading protrusion 30b. The leading protrusion 30b has a tapered inner periphery at the base end of the passage entrance 23b, the diameter of which decreasing toward the leading end. The first valve seat 31 is formed on this tapered inner periphery. An annular groove 30c is formed on the outer periphery of the barrel 30a in the longitudinally middle portion. An annular passageway 23c communicating with the fluid passageway 21a is formed between the annular groove 30c and the peripheral surface of the first fitting hole 22, whereby multiple passageways 23d connecting the passageways 23a and 23c are formed in the barrel 30a. A compression coil spring 34 as the first valve casing biasing means for biasing the first valve casing 30 outward (toward the leading end) is fitted on the barrel 30a between a flange 30d near the base end of the annular groove 30c of the barrel 30a and the base end face of the first fitting hole 22.

The first valve body 35 has, from the base end to the leading end, a shaft part 35a, a large-diameter head part 35b, a middle head part 35c, and a leading head part 35d. An annular member 37 is provided in the first valve casing 30 at the base end portion. A stop ring 38 is provided on the inner surface of the first valve casing 30 at the base end. Engaging with the stop ring 38, the annular member 37 does not move to the base end. A barrel 37a extending toward the leading end is formed in the center part of the annular member 37. The shaft part 35a of the first valve body 35 is slidably fitted and guided in the barrel 37a. Multiple passageways 23e connecting the passageway 23a and fluid passageway 21b are formed in the annular member 37.

A compression coil spring 40 is fitted on the shaft part 35a of the first valve body 35 between the large-diameter head part 35b and annular member 37. An annular seal 39 is fitted on the outer periphery of the base end portion of the leading head part 35a of the first valve body 35, constituting a first valve portion 36. When the first open/close valve 45 is closed, the leading end portion of the leading head part 35d of the first valve body 35 is fitted in the passage entrance 23b of the first valve casing 30 and the leading end faces of the first valve body 35 and first valve casing 30 are nearly continuous and flush with each other.

As shown in FIGS. 2 and 8 to 10, the male joint 25 comprises a second valve casing 50 fitted in a second fitting hole 27 formed in the clamping plate 11 and having a second valve seat 51 in the leading end portion, a second valve body 55 fitted in the second valve casing 50 movably in the advancing/retreating direction and having in the leading end portion a second valve portion 56 abutting on the second valve seat 51 from the outside (the leading end side), and a compression coil spring 60 as the second biasing means for biasing the second valve body 55 toward the closing position (toward the base end) in relation to the second valve casing 50 somewhere on the clamping plate 11 other than the area where multiple magnet units 80 are installed (for example along a side of the clamping plate 11).

The second fitting hole 27 is circular in cross-section and open on the surface (the fixing surface 11a) of the clamping plate 11. A second fluid passage 26 is connected to the peripheral surface of the second fitting hole 27. The aforementioned surface 11a of the clamping plate 11 and the leading end face of the second valve casing 50 are substantially flush with each other and the second valve seat 51 and second valve portion 56 constitute a second open/close valve 65.

The second valve casing 50 has a barrel 50a and a leading wall 50b. A leading protrusion 50c is formed on the leading wall 50b. The barrel 50a is fitted in the second fitting hole 27. The base end portion of the barrel 50a is screwed on and fixed to the peripheral surface of the second fitting hole 27. The leading end face of the leading protrusion 50c and the surface 11a of the clamping plate 11 are substantially flush with each other. Annular seals 52 and 53 are fitted on the outer periphery of the barrel 50a in the leading end portion and in the longitudinally middle portion.

A passageway 54a is formed in the second valve casing 50 and a passage entrance 54b connecting the passageway 54a to the outside is formed in the leading wall 50b. Formed in the leading wall 50b at the leading end of the passage entrance 54b, an annular recess 50d having a diameter larger than the passage entrance 54b opens at the leading end. An annular sealing member 61 is fitted in the annular recess 50d. The annular sealing member 61 constitutes a second valve seat 51 and abuts on the leading end of the first valve casing 30 of the female joint 20 around the passage entrance 23b.

An annular groove 50e is formed on the outer periphery of the second valve casing 50 between annular seals 52 and 53 and an annular passageway 54c communicating with the second fluid passage 26 is formed between the annular groove 50e and the peripheral surface of the second fitting hole 27, whereby multiple passageways 54d connecting the passageways 54a and 54c are formed in the second valve casing 50.

The second valve body 55 has, from the base end to the leading end, a piston part 55a, a shaft base part 55b, a shaft part 55c, and a leading valve portion forming part 55d. The leading valve portion forming part 55 is increased in diameter toward the leading end and the second valve portion 56 is formed on the outer periphery thereof. An annular seal 57 is fitted on the outer periphery of the piston part 55a. The piston part 55a is slidably fitted in the second valve casing 50. Stop rings 58 and 59 are fitted on the peripheral surface of the base end portion of the second valve casing 50. Engaging with the stop rings 58 and 59, the second valve body 55 does not move to the base end.

The compression coil spring 60 is fitted on the shaft base part 55b and shaft part 55c of the second valve body 55 between the piston part 55a of the second valve body 55 and the leading wall 50b of the second valve casing 50. When the second open/close valve 65 is closed, the leading end face of the second valve body 55, leading end face of the second valve casing 50 (the leading protrusion 50c), and the surface 11a of the clamping plate 11 are flush with each other.

Figure 9:
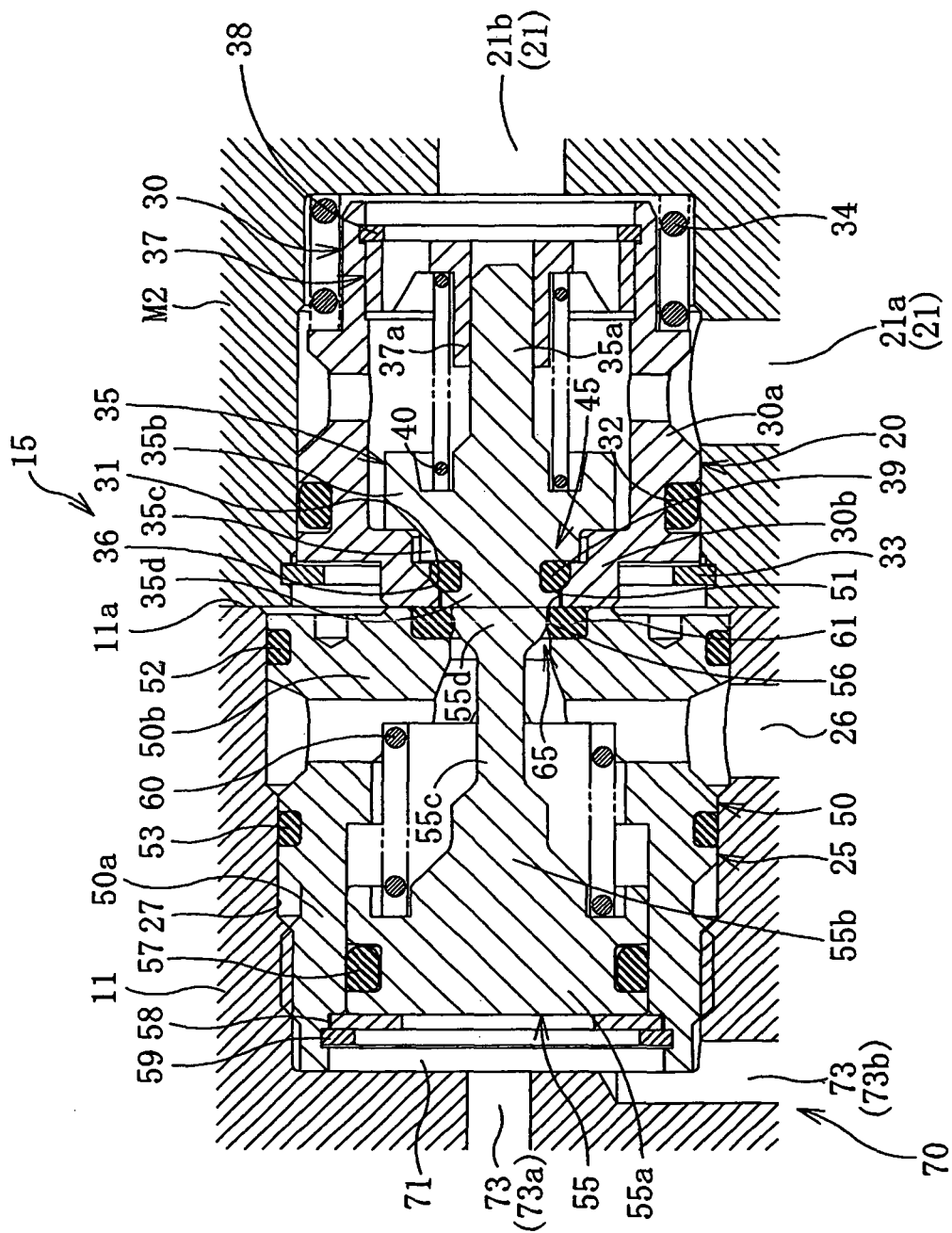
FIG. 9 is a cross-sectional view of the male and female joints of embodiment 1 in the abutting state.
Figure 10:
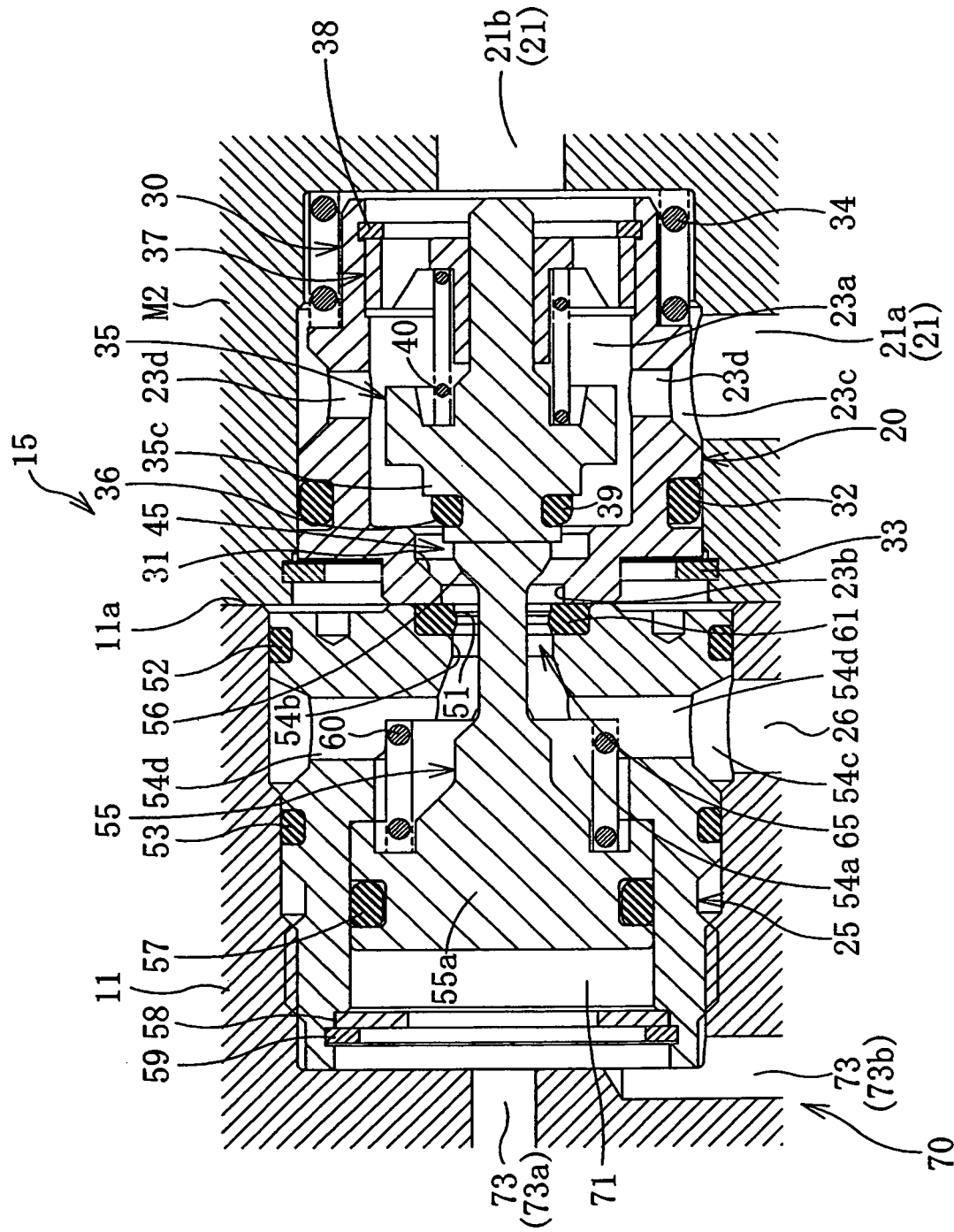
FIG. 10 is a cross-sectional view of the male and female joints of embodiment 1 in the connected state.
Figure 11:
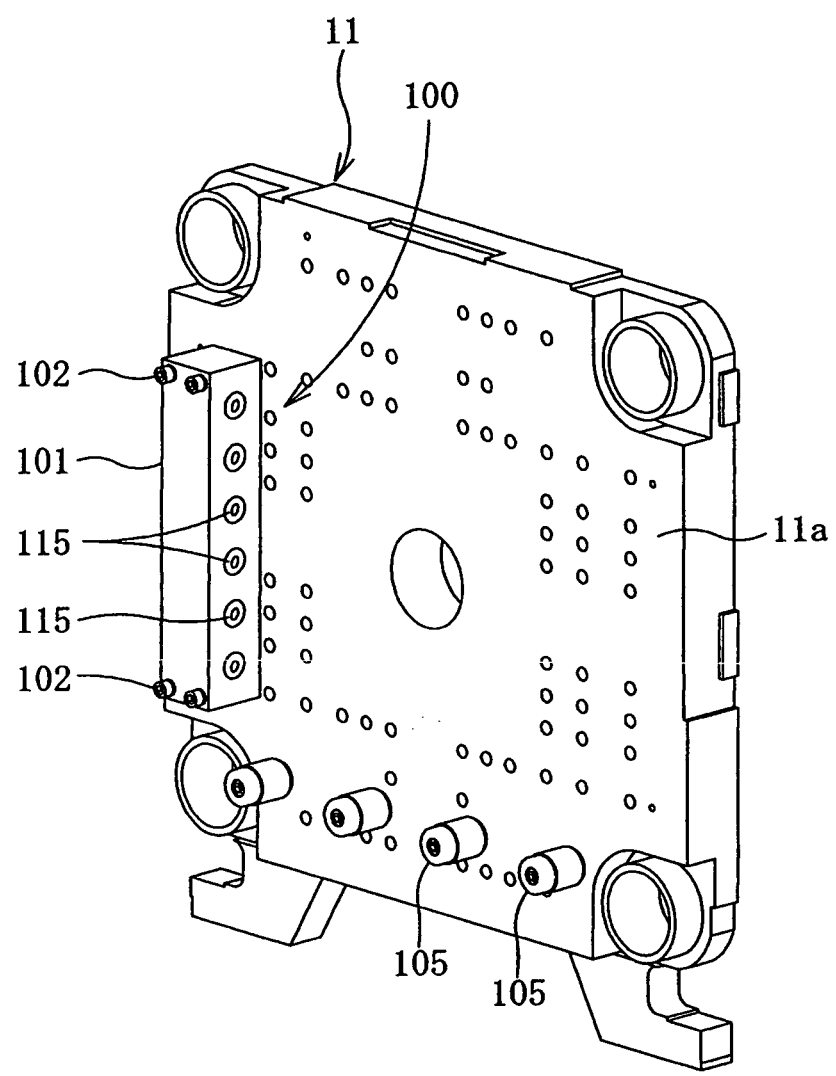
FIG. 11 is a perspective view of the core part including the clamping plate and male joint of embodiment 2.

The coupling device 15 comprises a valve body drive unit 70 as the valve body drive means for advancing only the second valve body 55 in relation to the second valve casing 50 in the male joint 25 so as to drive the first and second valve bodies 35 and 55 to the opening positions as shown in FIG. 10 while the leading ends of the first and second valve casings 30 and 50 abut on each other as shown in FIG. 9. The fluid pressure supply unit 72 of the valve body drive unit 70 is shared by multiple sets of male and female joints 20 and 25 to drive the multiple first and second valve bodies 35 and 55 of the multiple sets of male and female joints 20 and 25 to the opening positions all at once.

As shown in FIGS. 2 and 8 to 10, the valve body drive unit 70 has the aforementioned piston part 55a provided integrally with the second valve body 55 of each male joint 25, a fluid pressure operation chamber 71 applying a fluid pressure (for example air pressure or hydraulic pressure) to the piston part 55a, and a fluid pressure supply unit 72 as the fluid pressure supply means for supplying a fluid pressure to the fluid pressure operation chamber 71.

The fluid pressure operation chamber 71 is provided to each male joint 25. The fluid pressure operation chamber 71 is formed in the area enclosed by the base end surface of the second fitting hole 27, base end portion of the second valve casing 50, and piston part 55a. The clamping plate 11 has a fluid pressure passage 73 connecting multiple fluid pressure operation chambers 71 corresponding to multiple male joints 25 and a fluid pressure port 74 for the fluid pressure passage 73. The fluid pressure port 74 and fluid pressure supply unit 72 are connected by a fluid pressure hose 75. The control device 33 controls the fluid pressure supply unit 72 to supply/discharge the fluid pressure to/from each fluid pressure operation chamber 71.

A fluid pressure passage 73a of the fluid pressure passage 73 is connected to the fluid pressure operation chamber 71 in the middle portion of the base end surface of the second fitting hole 27. A fluid pressure passage 73b of the fluid pressure passage 73 is connected to the second fitting hole 27 on the outer periphery of the base end surface. It is possible to use at least one of the fluid pressure passageways 73a and 73b and omit the fluid pressure passageway 73a or 73b.

Here, the passage entrance 23b formed in the leading protrusion 30b of the first valve casing 30 has a larger (for example approximately 1.3 times larger) diameter than the leading valve portion forming part 55d of the second valve body 55 and the annular width of the leading end face of the leading protrusion 30b of the first valve casing 30 and the annular width of the annular sealing member 61 are formed large to a certain extent. Consequently, when the leading ends of the first and second valve casings 30 and 50 abut on each other with the axes of the female and male joints 20 and 25 being shifted within a predetermined range, the valve body drive unit 70 can advance the second valve body 55 so as to drive the first and second valve bodies 35 and 55 to the opening positions and connect the female and male joints 20 and 25.

Actions and advantages of the above described coupling device 15 will be described hereafter.

Figure 8:
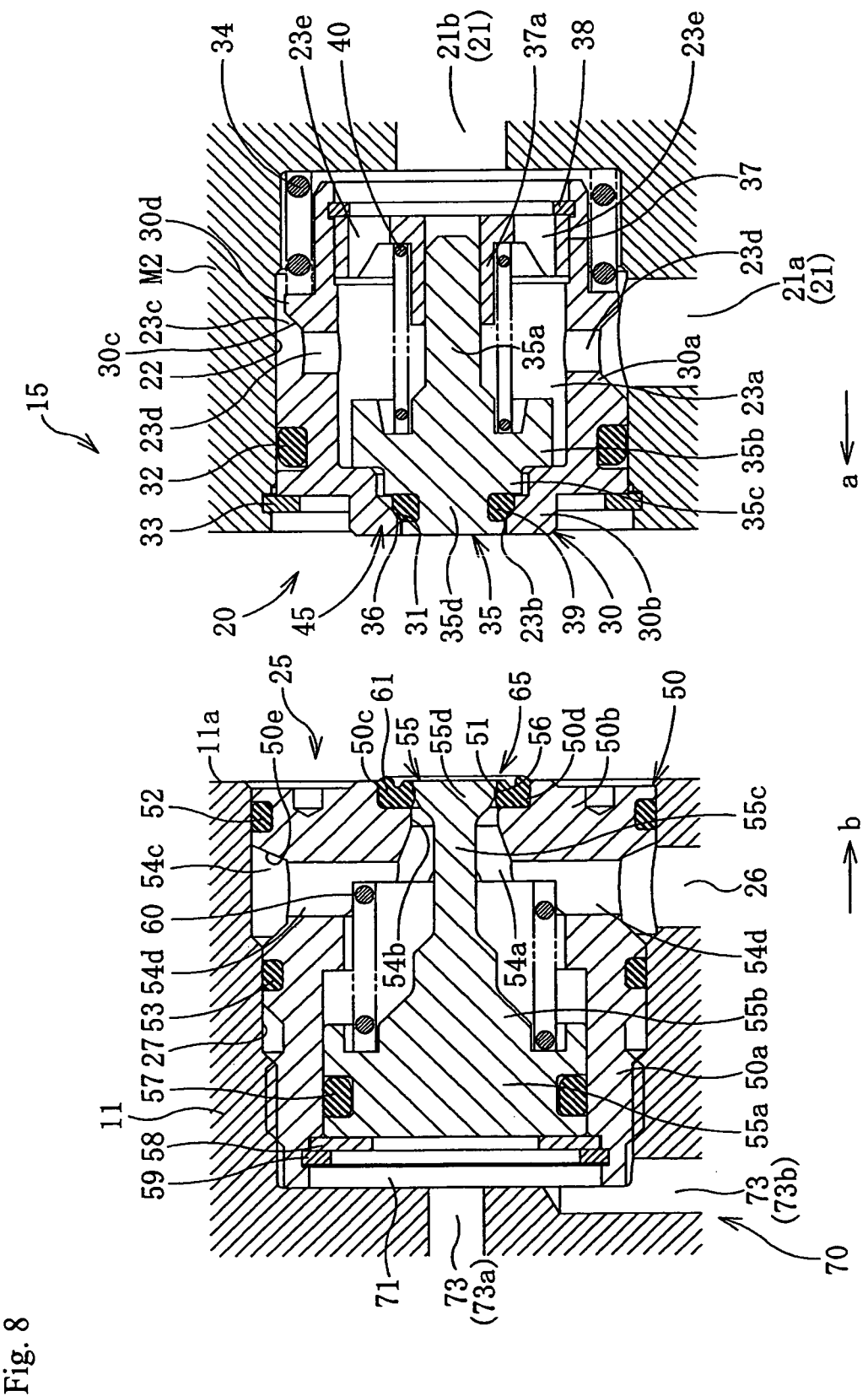
FIG. 8 is a cross-sectional view of the male and female joints of embodiment 1 in the separated state.

First, before the mold M2 is fixed to the clamping plate 11, the female and male joints 20 and 25 are separated and the first and second open/close valves 45 and 65 are closed as shown in FIG. 8. Then, the mold M2 will be conveyed to be fixed to the clamping plate 11. Here, the female and male joints 20 and 25 do not protrude from the surfaces of the mold M and clamping plate 11. Therefore, the space between the mold M2 and clamping plate 11 can be minimized while the mold M is moved in parallel to the fixing surface 11a of the clamping plate 11.

Then, for fixing the mold M2 to the clamping plate 11 in a predetermined positional relationship, the mold M2 is moved to the clamping plate 11 as the female and male joints 20 and 25 face each other as shown in FIG. 8. Consequently, as shown in FIG. 9, the aforementioned surfaces of the mold M2 and clamping plate 11 abut on each other and the leading ends of the first and second valve casings 30 and 50 abut on each other. In this state, the mold M2 is fixed to the clamping plate 11.

Here, since the first valve casing 30 slightly protrudes forward from the first fitting hole 22, the leading ends of the first and second valve casings 30 and 50 steadily abut on each other. Then, the first valve casing 30 is pushed against the biasing force of the compression coil spring 34 and slightly retreated in the second valve casing 50 together with the first valve body 35 and annular member 37. When the leading ends of the first and second valve casings 30 and 50 abut on each other, the annular sealing member 61 abuts on the leading end of the first valve casing 30 around the passage entrance 23b. The annular sealing member 61 connects the passage entrance 23b of the first valve casing 30 and the passage entrance 54b of the second valve casing 50 in a sealed manner.

Then, as shown in FIG. 10, the fluid pressure supply unit 72 is driven so that a fluid pressure is supplied to each fluid pressure operation chamber 71, the fluid pressure is applied to the piston part 55, the second valve body 55 is advanced against the biasing force of the compression coil spring 60, and the second open/close valve 65 is opened. Furthermore, when the second valve body 55 is advanced, it is inserted in the first valve casing 30 through the passage entrance 23b. Then, the second valve body 55 pushes and retreats the first valve body 35 against the biasing force of the compression coil spring 40, whereby the first open/close valve 45 is opened.

In this way, the female and male joints 20 and 25 are connected and the first and second fluid passages 21 and 26 are connected though the passageways and passage entrances 23a to 23e of the female joint 20 and the passageways and passage entrances 54a to 54d of the male joint 25. In this state, the fluid supply/discharge unit 31 is driven so that the fluid is supplied/discharged to/from multiple first fluid passages 21 in the mold M2. When the fluid pressure is released from each fluid pressure operation chamber 71, the first and second valve bodies 35 and 55 are returned by the compression coil springs 40 and 60 and the first and second open/close valves 45 and 65 are closed. In this state, the mold M2 can be unfixed from the clamping plate 11.

This coupling device 15 comprises the valve body drive unit 70 advancing only the second valve body 55 in relation to the second valve casing 50 in the male joint 25 so as to drive the first and second valve body 35 and 55 to the opening positions while the leading ends of the first and second valve casing 30 and 50 abut on each other. In this way, the valve body drive unit 70 drives only the first and second valve bodies 35 and 55 so as to open the first and second open/close valves 45 and 65 while the leading ends of the first and second valve casing 30 and 50 abut on each other, whereby the female joint 20 can be simplified in structure and downsized. Furthermore, as for the male joint 25, a simple and small fluid pressure cylinder can be used for advancing the second valve body 55 in relation to the second valve casing 50 by means of the valve body drive unit 70, whereby the male joint structure including the male joint 25 and fluid pressure cylinder can be simplified and downsized.

Hence, the space for fitting the female joint 20 and male joint 25 (male joint structure) is assured on the existing mold M2 and clamping plate 11. Furthermore, the valve body drive unit 70 drives only the first and second valve bodies 35 and 55 to open the first and second open/close valves 45 and 65 while the leading ends of the first and second valve casings 30 and 50 abut on each other. Therefore, the intended behavior of the coupling device 15 is assured in the configuration in which the aforementioned surface of the mold M2 and the leading end face of the first valve casing 30 of the female joint 20 are substantially flush with each other and the aforementioned surface of the clamping plate 11 and the leading end face of the second valve casing 50 of the male joint 25 are substantially flush with each other.

Even in the case in which multiple sets of male and female joints 20 and 25 are provided to the mold M2 and clamping plate 11, the female joint 20 and male joint 25 (male joint structure) can be downsized as in this embodiment and, therefore, properly arranged. Furthermore, the total weight of the mold M2 and multiple female joints 20 will not excessively be increased; therefore, increase in the workload of moving them can be suppressed. The total weight of the clamping plate 11 and multiple male joints 25 (male joint structure) will not excessively be increased; therefore, increase in the workload of moving them can be suppressed.

As described above, the aforementioned surface of the mold M2 and the leading end face of the first valve casing 30 of the female joint 20 are substantially flush with each other and the aforementioned surface of the clamping plate 11 and the leading end face of the second valve casing 50 of the male joint 25 are substantially flush with each other, whereby the female and male joints 20 and 25 do not protrude substantively from the mold M2 and clamping plate 11 and cause no obstruction. The mold M2 can be fixed to the clamping plate 11 without using a conventional clamping member. Then, in conveying the mold M2 for fixing it to the clamping plate 11, the mold M2 can be moved in parallel to the clamping plate 11 with the minimized space between the mold M2 and clamping plate 11, achieving improvement in saving the conveyance space.

Having a piston part 55a provided integrally with the second valve body 55 of the male joint 25, a fluid pressure operation chamber 71 applying a fluid pressure to the piston part 55a, and a fluid pressure supply unit 72 supplying the fluid pressure to the fluid pressure operation chamber 71, the valve body drive unit 70 can securely advance the second valve body 55 in relation to the second valve casing 50. Furthermore, the piston part 55a is integrated in the second valve body 55 and the fluid pressure operation chamber 71 can have a simple structure and easily be provided, ensuring that the male joint structure can be simplified and downsized.

Multiple sets of female and male joints 20 and 25 are provided and the fluid pressure supply unit 72 is shared by the multiple sets of female and male joints 20 and 25. Therefore, it is unnecessary to provide as many fluid pressure supply unit 72 as the number of female joints, whereby the coupling device 15 can be simplified in structure. The first valve casing 30 of the female joint 20 is fitted in the first fitting hole 22 movably in the retreating direction and the compression coil spring 34 biasing the first valve casing 30 outward is provided, whereby errors in manufacturing the female and male joints 20 and 25 and errors in assembling them to the mold M2 and clamping plate 11 are absorbed when the mold M2 is fixed to the clamping plate 11, ensuring that the leading ends of the first and second valve casings 30 and 50 abut on each other.

The second valve seat 51 of the male joint 25 consists of an annular sealing member 61 fitted on the leading end of the second valve casing 50 and the annular sealing member 61 abuts on the leading end of the first valve casing 30 of the female joint 20, whereby this single annular sealing member 61 constitutes the second valve seat 51 of the male joint 25 and ensures that the leading ends of the first and second valve casing 30 and 50 abut on each other in a sealed manner. Hence, the male joint 25 can be simplified in structure (reduced in the number of parts) while these two functions are ensured.

Embodiment 2

In the coupling device of embodiment 2, the female joint is fitted on a mold as the first member and the male joint is fitted on a joint fitting member as the second member that is a platen auxiliary and fixed to the clamping plate for fixing the mold in a horizontal injection molding machine, whereby the first fluid passage in the mold and the second fluid passage in the joint fitting member are connected/disconnected when the mold is locked/unlocked to/from the clamping plate.

As shown in FIGS. 11 to 15, a coupling device 100 comprises multiple (for example six) female joints 110 fitted on the mold M2 and multiple (for example six) male joints 115 fitted on a joint fitting member 101 fixed to the clamping plate 11 and paired with the multiple female joints 110, whereby multiple (for example six) first fluid passages 111 in the mold M2 and multiple (for example six) second fluid passages 116 in the joint fitting member 101 are connected/disconnected through the multiple sets of female and male joints 110 and 115 when the mold M2 is fixed/unfixed to/from the clamping plate 11 in a predetermined positional relationship.

The joint fitting member 101 has an elongated block form and vertically placed on the fixing surface 11a of the clamping plate 11 along the side area out of the area where the mold M2 is fixed and fastened by multiple bolts 102. Not-shown fluid ports of the second fluid passages 116 are formed on the joint fitting member 101 and the fluid ports and fluid supply/discharge unit are connected by fluid hoses. The fluid supply/discharge unit is driven while the multiple first and second fluid passages 111 and 116 are connected, whereby a fluid is supplied/discharged to/from the multiple first fluid passages 111 in the mold M2. Here, the injection molding machine 1 comprising the clamping plate 11 is basically the same as in embodiment 1 and will not be described in detail.

The female and male joints 110 and 115 will be described in detail hereafter.

Figure 12:
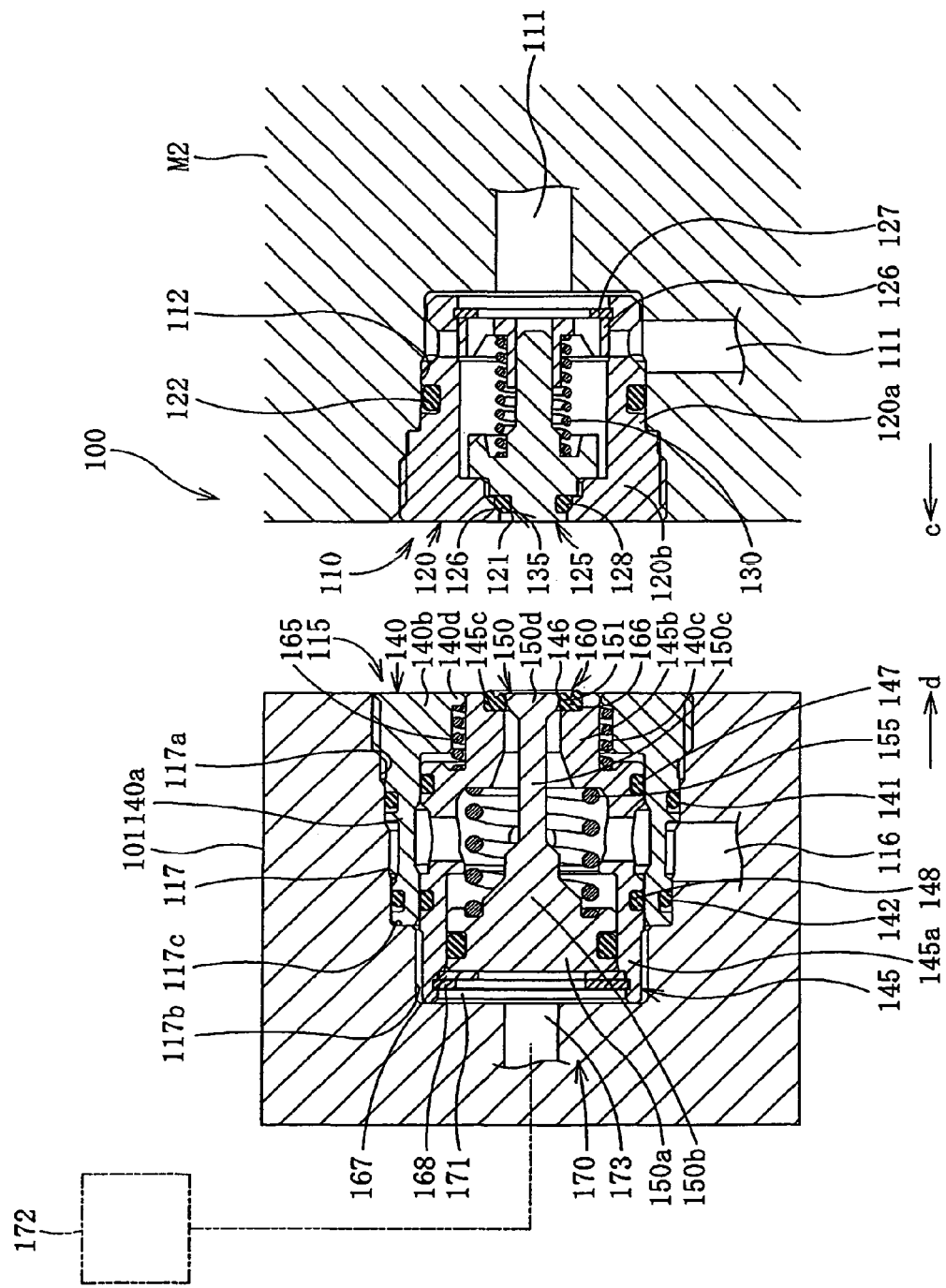
FIG. 12 is a cross-sectional view of the male and female joints of embodiment 2 in the separated state.

The female joint 110 will be described on the premise that the arrow c points to the leading end in FIG. 12 and the male joint 115 will be described on the premise that the arrow d points to the leading end in FIG. 12.

As shown in FIGS. 12 to 15, the female joint 110 has a first valve casing 120 fitted in a first fitting hole 112 formed in the mold M2 and having a first valve seat 121 in the leading end portion, a first valve body 125 fitted in the first valve casing 120 movably in the advancing/retreating direction and having in the leading end portion a first valve portion 126 abutting on the first valve seat 121 from the inside (base end side), and a compression coil spring 130 as the first biasing means for biasing the first valve body 125 toward the closing position (leading end) in relation to the first valve casing 120.

The first fitting hole 112 is circular in cross-section and open on the surface of the mold M2 (the surface facing the joint fitting member 101 when the mold M2 is fixed to the clamping plate 11). A first fluid passage 111 is connected to the base end portion of the first fitting hole 112. The aforementioned surface of the mold M2 and the leading end face of the first valve casing 120 are substantially flush with each other and the first valve seat 121 and first valve portion 126 constitute a first open/close valve 135.

The first valve casing 120 has a barrel 120a and a leading wall 120b. The barrel 120a is fitted in the first fitting hole 112 and the leading end portion of the barrel 120a is screwed on and fixed to the peripheral surface of the first fitting hole 112. An annular seal 122 is fitted on the outer periphery of the longitudinally middle portion of the barrel 120a. The leading wall 120b includes the same structure as the central core part of the leading protrusion 30b of the first valve casing 30 in embodiment 1 and will not be described in detail.

A first valve body 125, an annular member 126, a stop ring 127, an annular seal 128, and a compression coil spring 130 are provided in the first valve casing 120. They have basically the same structures as the first valve body 35, annular member 37, stop ring 38, annular seal 39, and compression coil spring 40 in embodiment 1, respectively, and will not be described in detail.

As shown in FIGS. 11 to 15, the male joint 115 comprises a casing member 140 fitted in a second fitting hole 117 formed in the joint fitting member 101, a second valve casing 145 fitted in the second fitting hole 117 via a casing member 140 movably in the advancing/retreating direction and having a second valve seat 146 in the leading end portion, a second valve body 150 fitted in the second valve casing 145 movably in the advancing/retreating direction and having in the leading end portion a second valve portion 151 abutting on the second valve seat 146 from the outside (leading end side), and a compression coil spring 155 as the second biasing means for biasing the second valve body 150 toward the closing position (base end) in relation to the second valve casing 145.

The second fitting hole 117 is circular in cross-section and has a large-diameter hole 117a in the leading end portion and a small-diameter hole 117b in the base end portion. The second fitting hole 117 is open on the surface of the joint fitting member 101 (the surface facing the mold M2 when the mold M2 is fixed to the clamping plate 11) and a second fluid passage 116 is connected to the peripheral surface of the second fitting hole 117 (large-diameter hole 117a). The aforementioned surface of the joint fitting member 101 and the leading end face of the second valve casing 145 are substantially flush with each other and the second valve seat 146 and second valve portion 151 constitute a second open/close valve 160.

The casing member 140 has a barrel 140a and a leading wall 140b. The barrel 140a is fitted in the large-diameter hole 117a of the second fitting hole 117. The leading end portion of the barrel 140a is screwed on and fixed to the peripheral surface of the large-diameter hole 117a with the base end of the barrel 140a abutting on a step 117c at the border between the large-diameter hole 117a and small-diameter hole 117b of the second fitting hole 117. Annular seals 141 and 142 are fitted on the barrel 140a in the longitudinally middle portion and in the base end portion. A circular opening 140c is formed in the leading wall 140b and an inner flange 140d is formed at the leading end of the leading wall 140b. The leading end face of the casing member 140 is flush with the aforementioned surface of the joint fitting member 101.

The second valve casing 145 has a barrel 145a and a leading protrusive barrel 145b. The leading end portion of the barrel 145a is slidably fitted in the barrel 140a of the casing member 140. Annular seals 147 and 148 are placed on the outer periphery of the leading end portion of the barrel 145a. The base end portion of the barrel 145a is housed in the small-diameter hole 117b of the second fitting hole 117. The leading protrusive barrel 145b is inserted in the circular opening 140c of the casing member 140 and slidably fitted in the inner flange 140d.

A compression coil spring 165 as the second valve casing biasing means for biasing the second valve casing 145 in the retreating direction is fitted on the leading protrusive barrel 145b of the second valve casing 145 between the inner flange 140d of the casing member 140 and the barrel 145a of the second valve casing 145. The second valve casing 145 does not move in the retreating direction because its base end abuts on the base end face of the second fitting hole 117. In this state, the leading end face of the second valve casing 145 is flush with the aforementioned surface of the joint fitting member 101 and the leading end face of the casing member 140. From this state, the second valve casing 145 can be advanced. Latched by the leading wall 140b of the casing member 140, the barrel 145a of the second valve casing 145 does not move in the advancing direction.

The leading protrusive barrel 145b has in the leading end portion an annular recess 145c that is open in the leading end. An annular sealing member 166 is fitted in the annular recess 145c. The annular sealing member 166 constitutes a second valve seat 146 and is capable of abutting on the leading end of the first valve casing 120 of the female joint 110.

The second valve body 150 has, from the base end to the leading end, a piston part 150a, a shaft base part 150b, a shaft part 150c, and a leading valve portion forming part 150d. The second valve body 150 has basically the same structure as the second valve body 55 in embodiment 1. Stop rings 167 and 168 similar to the stop rings 58 and 59 in embodiment 1 are fitted in the second valve casing 145. A compression coil spring 155 is fitted in the same manner as the compression coil spring 60 in embodiment 1.

Figure 13:
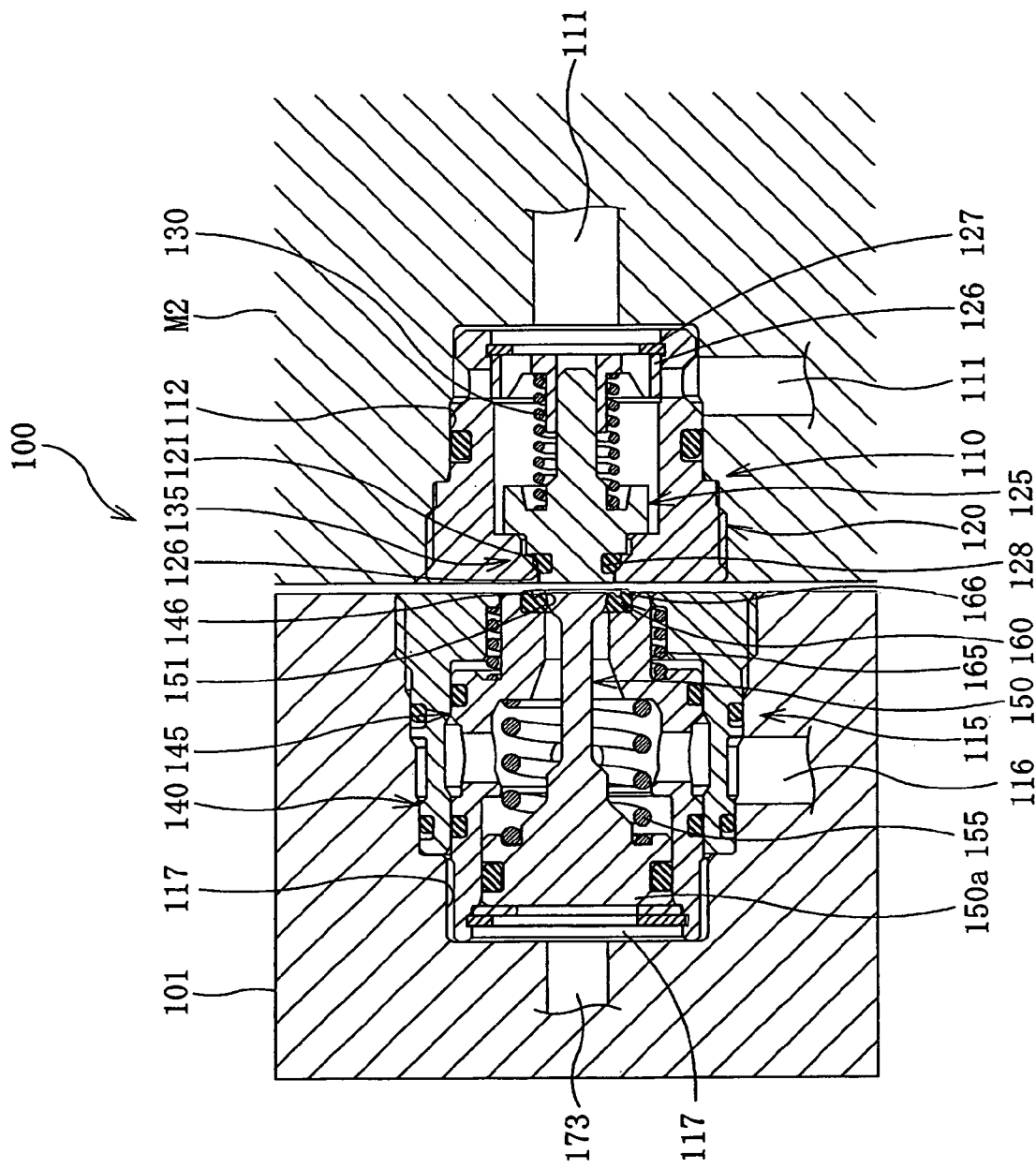
FIG. 13 is a cross-sectional view of the male and female joints of embodiment 2 in the closely facing state.
Figure 14:
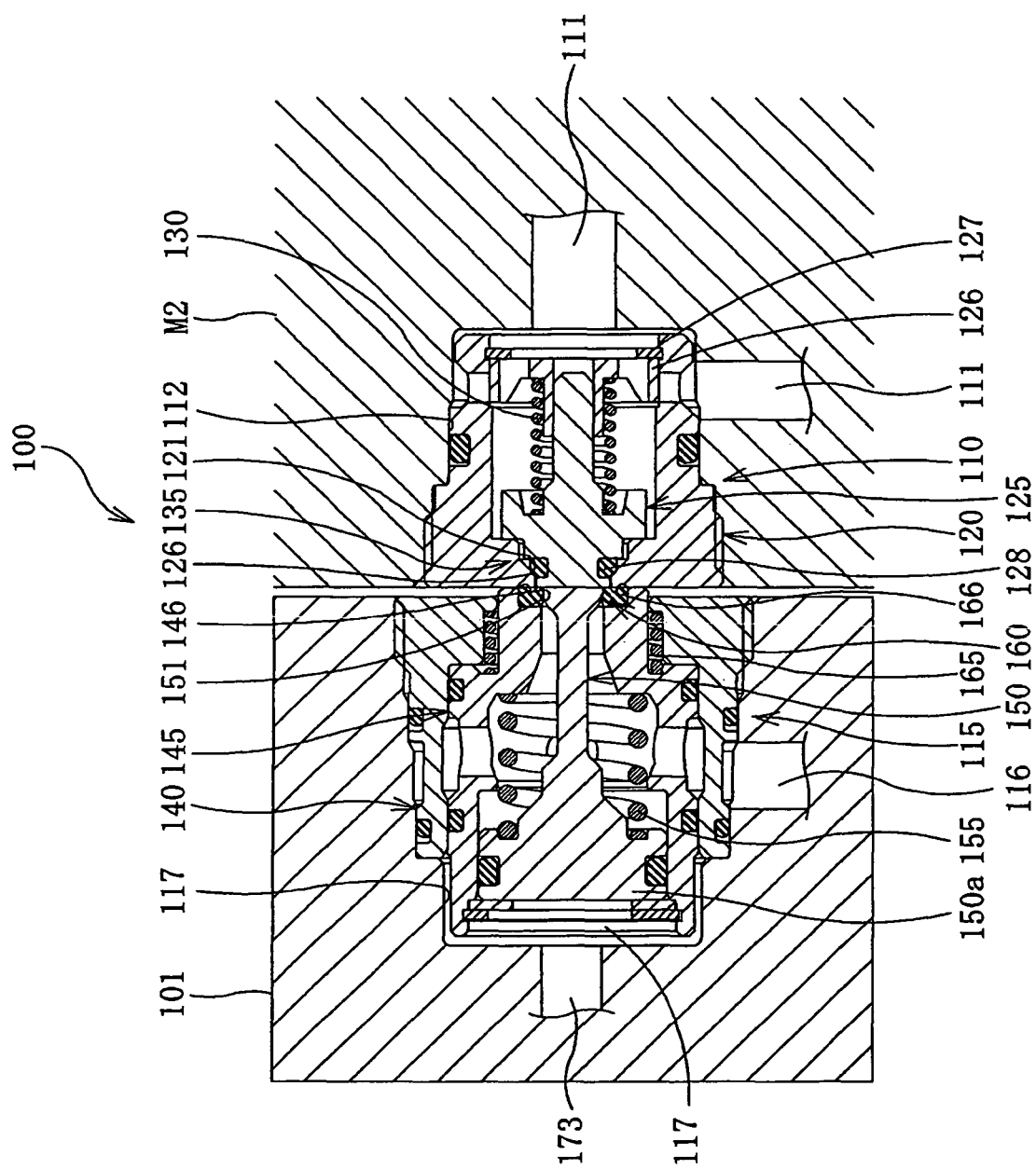
FIG. 14 is a cross-sectional view of the male and female joints of embodiment 2 in the abutting state.
Figure 15:
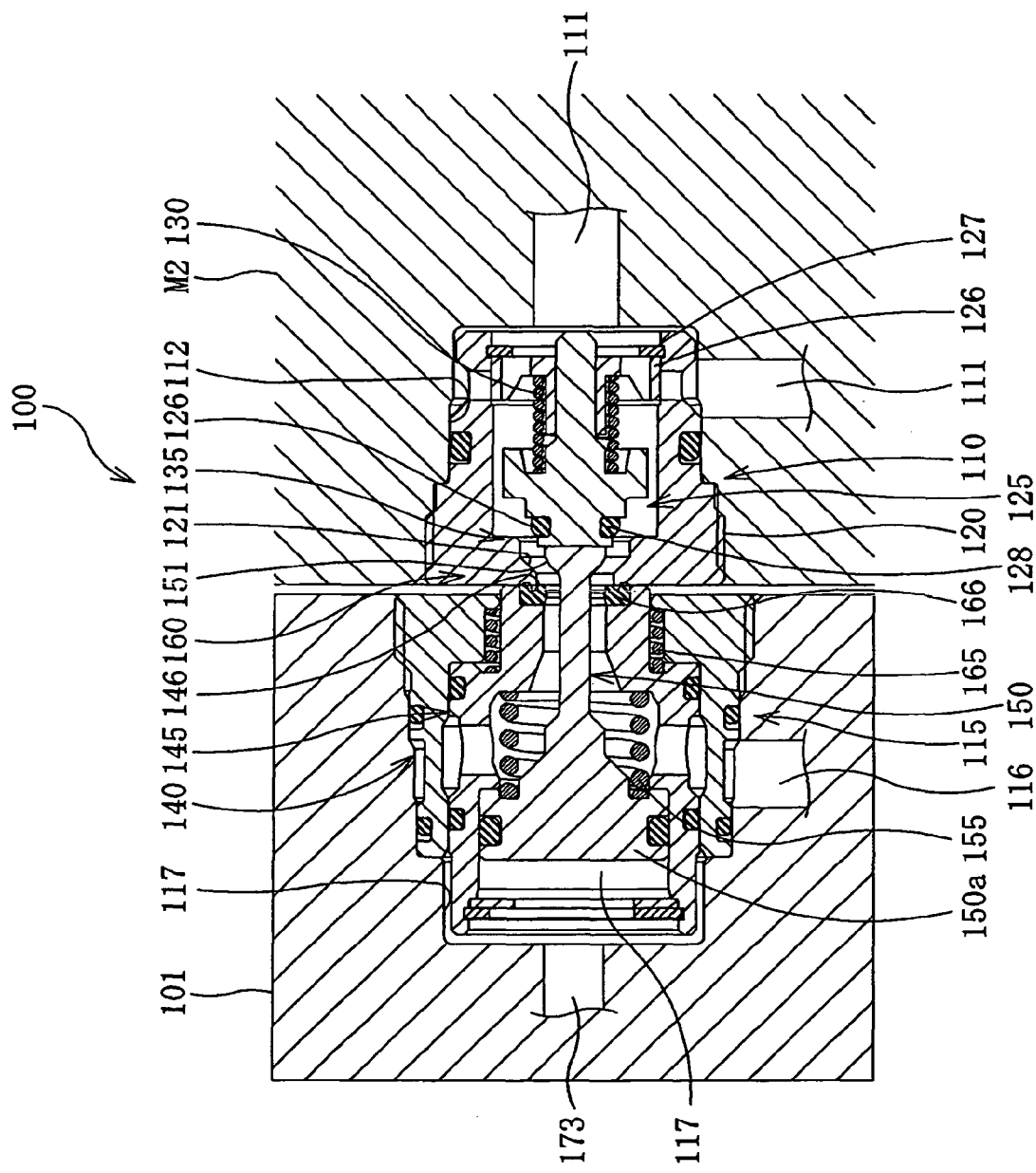
FIG. 15 is a cross-sectional view of the male and female joints of embodiment 2 in the connected state.

The coupling device 100 comprises a valve body drive unit 170 as the valve body drive means for advancing the second valve casing 145 and second valve body 150 of the male joint 115 together while the first and second valve casing 120 and 145 closely face each other as shown in FIG. 13 so that the leading ends of the first and second valve casings 120 and 145 abut on each other as shown in FIG. 14 and, then, advancing only the second valve body 150 in relation to the second valve casing 145 in the male joint 115 so as to drive the first and second valve bodies 125 and 150 to the opening positions as shown in FIG. 15.

The valve body drive unit 170 has basically the same structure as the valve body drive unit 70 in embodiment 1 and has the aforementioned piston part 150a provided integrally with the second valve body 150 of each male joint 115, a fluid pressure operation chamber 171 applying a fluid pressure to the piston part 150a and the base end of the second valve casing 145, the aforementioned compression coil spring 155, and a fluid pressure supply unit 172 supplying the fluid pressure to the fluid pressure operation chamber 171. The fluid pressure operation chamber 171 is formed in the area enclosed by the small-diameter hole 117b of the second fitting hole 117, base end portion of the second valve casing 145, and piston part 150a. A fluid pressure passageway 173 leading the fluid pressure from the fluid pressure supply unit 172 to the fluid pressure operation chamber 171 is formed in the joint fitting member 101.

Here, the valve body drive unit 170 can advance the second valve body 150 so as to drive the first and second valve bodies 125 and 150 to the opening positions and connect the female and male joints 110 and 115 while the leading ends of the first and second valve casing 120 and 145 abut on each other with the axes of the female and male joints 110 and 115 being shifted within a predetermined range.

Actions and advantages of the above described coupling device 100 will be described hereafter.

In conveying the mold M2 for fixing it to the clamping plate 11, the mold M2 is horizontally moved in parallel to the fixing surface 11a of the clamping plate 11 from the opposite side to the joint fitting member 101 using multiple rollers 105 attached to the clamping plate 11 and fixed to the clamping plate 11 in a predetermined positional relationship.

Here, as shown in FIG. 13, the first valve casing 120 of each female joint 110 and the second valve casing 145 of each male joint 115 closely face each other. A fluid pressure is supplied to the fluid pressure operation chamber 171 of the male joint 110. First, as shown in FIG. 14, while maintaining their integrity with the help of the biasing force of the compression coil spring 155, the second valve casing 145 and second valve body 150 advance together against the biasing force of the compression coil spring 165 and the leading end of the second valve casing 145 abut on the leading end of the first valve casing 120.

The fluid pressure continues to be supplied to the fluid pressure operation chamber 171 while the leading ends of the first and second valve casing 120 and 145 abut on each other. The second valve body 150 advances in relation to the second valve casing 145 to open the second open/close valve 160 and the second valve body 150 is inserted in the first valve casing 120 to push and retreat the first valve body 125 against the biasing force of the compression coil spring 130 so as to open the first open/close valve 135, In this way, the female and male joints 110 and 115 are connected and the first and second fluid passages 111 and 116 are connected. When the fluid pressure is released from each fluid pressure operation chamber 171, the second valve casing 145 and second valve body 150 are returned and retreated by the compression coil spring 155 and 165 and the first valve body 125 is returned by the compression coil spring 130, whereby the first and second open/close valves are closed.

In the coupling device 100, the second valve casing 145 of the male joint 115 is fitted in the second fitting hole 117 via a casing member 140 movably in the advancing direction, a compression coil spring 165 biasing the second valve casing 145 in the retreating direction is provided, the second valve casing 145 and second valve body 150 are advanced together when a fluid pressure is supplied to the fluid pressure operation chamber 171 while the first and second valve casings 120 and 145 closely face each other. After the leading ends of the first and second valve casings 120 and 145 abut on each other, the second valve body 120 is advanced in relation to the second valve casing 145. Therefore, prior to connecting the female and male joints 110 and 115, the mold M2 is fixed to the clamping plate 11 so that the first and second valve casings 120 and 145 closely face each other. Then, the leading ends of the first and second valve casings 120 and 145 are brought to securely abut on each other and the female and male joints 110 and 115 are securely connected. Other fundamental advantages are the same as those in embodiment 1.

Figure 16:
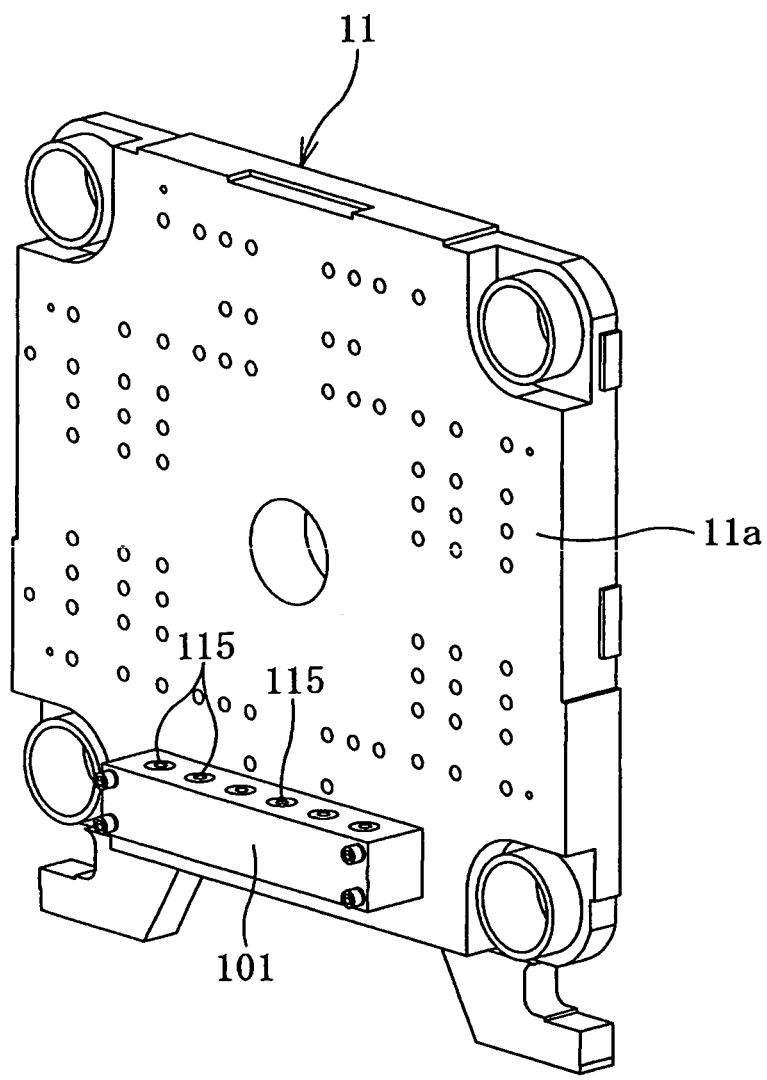
FIG. 16 is a perspective view of the core part including the clamping plate and male joint of a modification of embodiment 2.

As shown in FIG. 16, the joint fitting member 101 can be placed horizontally and fixed to the fixing surface 11a of the clamping plate 11 below the area where the mold M2 is fixed. In such a case, the mold M2 is moved downward in parallel to the fixing surface 11a of the clamping plate 11 and fixed to the clamping plate 11 in a predetermined positional relationship. Then, the female and male joints 110 and 115 are connected.

It is possible in embodiments 1 and 2 to fit the male joint 25 or 115 on the mold M2 and fit the female joint 20 or 110 on the clamping plate 11 or joint fitting member 101. It is also possible to fix to the mold M2 a not-shown joint fitting member that is a mold auxiliary similar to the joint fitting member 101 and fit the female joint 20 or 110 or the male joint 25 or 115 on this joint fitting member.

Embodiment 3

In the coupling device of embodiment 3, the female joint is fitted on the mold as the first member and the male joint is fitted on a platen as the second member for fixing the mold in a horizontal injection molding machine, whereby the first fluid passage in the mold and the second fluid passage in the platen are connected/disconnected when the mold is fixed/unfixed to/from the platen.

Figure 17:
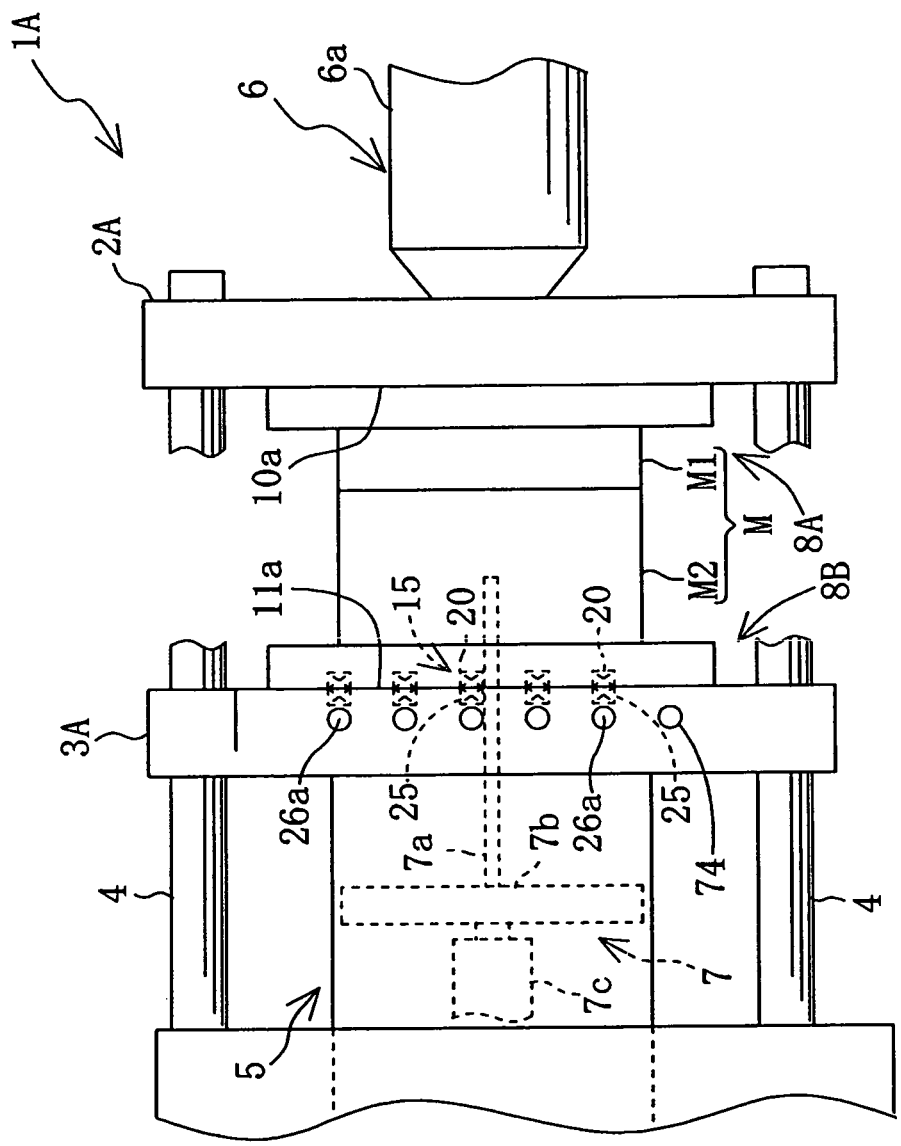
FIG. 17 is a side view of a horizontal injection molding machine of embodiment 3.
Figure 18:
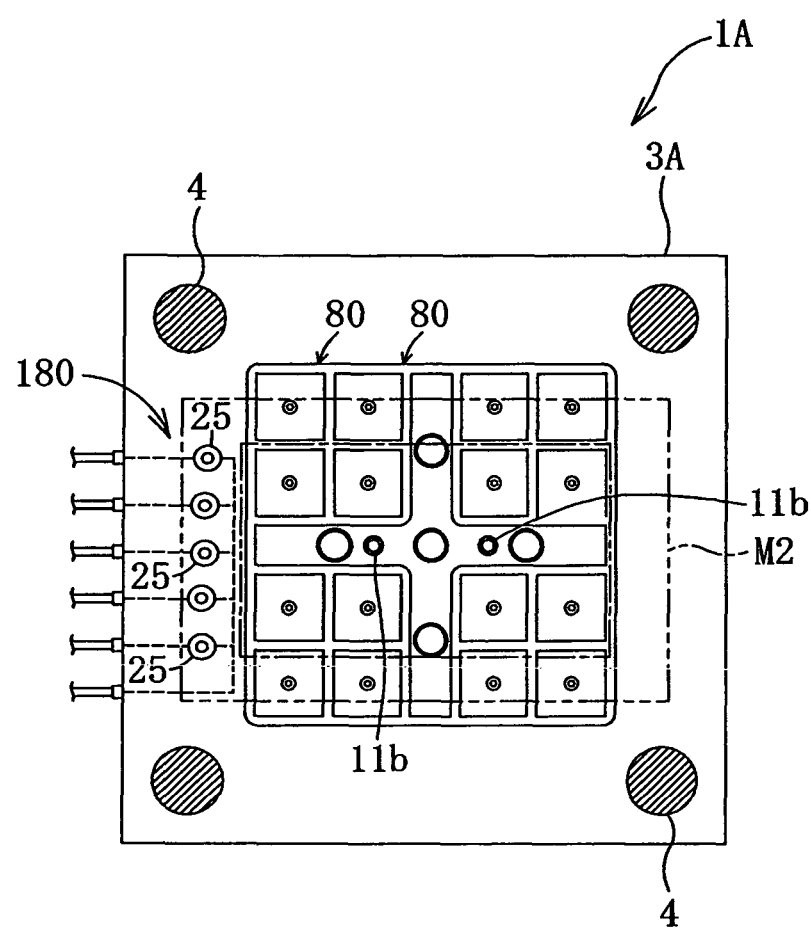
FIG. 18 is an illustration of the surface of the core part including the female joint of the coupling device of embodiment 3.

As shown in FIGS. 17 and 18, a horizontal injection molding machine 1A does not have the clamping plate 10 or 11 in the horizontal injection molding machine of Embodiment 1. A fixed platen 2A and a movable platen 3A have multiple magnets installed for generating a magnetic adsorption force and are alternatively switched between the active state in which the magnetic adsorption force is generated and the inactive state in which the magnetic adsorption force is not generated.

More specifically, the same multiple magnet units 80 as in embodiment 1 are installed in the same manner as those installed in the clamping plate 11 in embodiment 1. The same male joint 25 as in embodiment 1 is fitted somewhere on the movable platen 3A other than the area where the multiple magnet units 80 are installed (for example on one side of the movable platen 2A) in the same manner as that fitted on the clamping plate 11 in embodiment 1. This male joint 25 and the female joint 20 fitted on the mold M2 in the same manner as in embodiment 1 constitute a coupling device 180 of embodiment 3. Here, like the movable platen 3A, the fixed platen 2A also has multiple magnet units 80.

The coupling device 180 has basically the same advantages as embodiment 1 and can eliminate the clamping plate 10 or 11 in embodiment 1; therefore, the horizontal injection molding machine 1A can be simplified in structure and the molten resin injection path for injecting molten resin into the cavities of the molds M1 and M2 from the back of the fixed platen 2A can be shortened as the clamping plate 10 is eliminated, whereby the molten resin in a proper molten state can be injected into the cavities of the molds M1 and M2, increasing the accuracy of injection molding.

Embodiment 4

In the coupling device of embodiment 4, the female joint is fitted on the mold as the first member and the male joint is fitted on a joint fitting member as the second member that is a platen auxiliary and fixed to a platen for fixing the mold in a horizontal injection molding machine, whereby the first fluid passage in the mold and the second fluid passage in the joint fitting member are connected/disconnected when the mold is fixed/unfixed to/from the platen.

Figure 19:
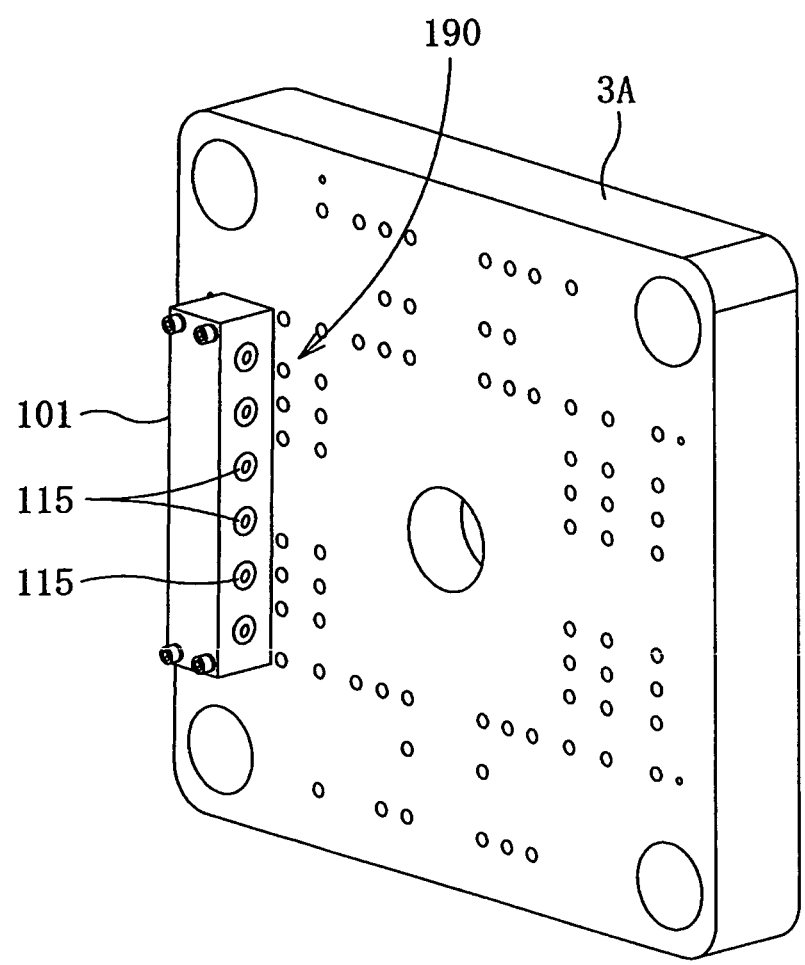
FIG. 19 is a perspective view of the core part including the platen and male joint of embodiment 4.
Figure 20:
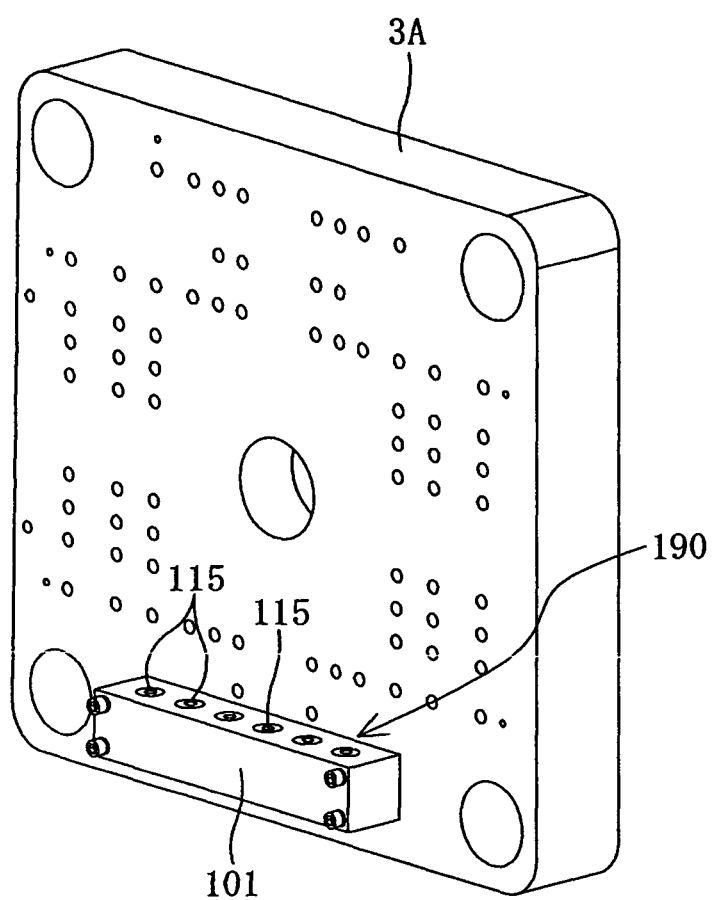
FIG. 20 is a perspective view of the core part including the platen and male joint of a modification of embodiment 4.

The horizontal injection molding machine 1A is the same as in embodiment 3. However, as shown in FIGS. 19 and 20, the male joint 25 is not fitted on the movable platen 3A and the same joint fitting member 101 as in embodiment 2 is fixed to the movable 3A in the same manner as it is fixed to the clamping plate 11 in embodiment 2. The same male joint 115 as in embodiment 2 is fitted on this joint fitting member 101 and this male joint 115 and the female joint 110 fitted on the mold M2 in the same manner as in embodiment 2 constitute a coupling device 190 of embodiment 4.

The coupling device 140 has basically the same advantages as embodiment 3 and, additionally, facilitates the provision of the male joint 110 by fixing the joint fitting member 101 to the movable platen 3A, thereby improving versatility.

It is possible in embodiments 3 and 4 to fit the male joint 25 or 115 on the mold M and fit the female joint 20 or 110 on the movable platen 3A or joint fitting member 101. Furthermore, it is also possible to fix to the mold M a not-shown joint fitting member that is a mold auxiliary similar to the joint fitting member 101 and fit the female joint 20 or 110 or male joint 25 or 115 on this joint fitting member.

Modifications other than the above described matters can be made to the present invention without departing from the scope of the present invention. For example, in embodiments 2 and 4, the surface of the joint fitting member 101 can be flush with the fixing surface of the clamping plate 11 or movable platen 3A instead of protruding from the surface of the clamping plate 11 or movable platen 3A. Furthermore, the fluid pressure supply unit 72 or 172 can be replaced with a manually operated mechanical fluid pressure supply system. Furthermore, the number, arrangement, and structure of female and male joints can be modified as appropriate.

What is claimed is:

1. A coupling device comprising:
   a female joint having a first open/close valve and a male joint having a second open/close valve for connecting/disconnecting first and second fluid passages in first and second members;
   said female joint comprises a first valve casing fitted in a first fitting hole formed in the first member and having a first valve seat in a first leading end portion, a first valve body fitted in the first valve casing movably in an advancing/retreating direction and having in a first leading end part a first valve portion abutting on the first valve seat from an inside, and a first biasing means for biasing the first valve body toward a closing position;
   said male joint comprises a second valve casing fitted in a second fitting hole formed in the second member and having a second valve seat in a second leading end portion, a second valve body fitted in the second valve casing movably in an advancing/retreating direction and having in a second leading end part a second valve portion abutting on the second valve seat from an outside, and a second biasing means for biasing the second valve body toward a closing position;
   a surface of said first member and a leading end face of the first valve casing of the female joint are substantially flush with each other and a surface of said second member and a leading end face of the second valve casing of the male joint are substantially flush with each other; and
   a valve body drive means comprising a third fluid passage for driving the first and second valve bodies to the opening positions while leading ends of said first and second valve casings abut on each other is provided.

2. The coupling device according to claim 1, wherein one of said first and second members consists of a mold or a first joint fitting member fixed to the mold and the other consists of a second joint fitting member fixed to a clamping plate for fixing the mold in a molding machine, the second joint fitting member being fixed to the clamping plate having multiple magnets installed for generating a magnetic adsorption force and alternatively switched between an active state in which the magnetic adsorption force is generated and an inactive state in which the magnetic adsorption force is not generated.

3. The coupling device according to claim 1, wherein one of said first and second members consists of a mold or a joint fitting member fixed to the mold and the other consists of a platen for fixing the mold in a molding machine, the platen having multiple magnets installed for generating a magnetic adsorption force and being alternatively switched between an active state in which the magnetic adsorption force is generated and an inactive state in which the magnetic adsorption force is not generated.

4. The coupling device according to claim 1, wherein one of said first and second members consists of a mold or a first joint fitting member fixed to the mold and the other consists of a second joint fitting member fixed to a platen for fixing the mold in a molding machine, the second joint fitting member being fixed to the platen having multiple magnets installed for generating a magnetic adsorption force and alternatively switched between an active state in which the magnetic adsorption force is generated and an inactive state in which the magnetic adsorption force is not generated.

5. The coupling device according to claim 1, wherein one of said first and second members consists of a mold or a joint fitting member fixed to the mold and the other consists of a clamping plate for fixing the mold in a molding machine, the clamping plate having multiple magnets installed for generating a magnetic adsorption force and being alternatively switched between an active state in which the magnetic adsorption force is generated and an inactive state in which the magnetic adsorption force is not generated.

6. The coupling device according to any one of claim 2 to 4 or 5, wherein said valve body drive means advances only the second valve body in relation to the second valve casing in the male joint so as to drive the first and second valve bodies to the opening positions while the leading ends of said first and second valve casings abut on each other.

7. The coupling device according to claim 6, wherein said valve body drive means has a piston part provided integrally with the second valve body of the male joint, a fluid pressure operation chamber applying a fluid pressure to the piston part, and a fluid pressure supply means for supplying the fluid pressure to the fluid pressure operation chamber.

8. The coupling device according to claim 7, wherein,
multiple sets of said female and male joints are provided; and
said fluid pressure supply means is shared by the multiple sets of female and male joints.

9. The coupling device according to claim 6, wherein,
the first valve casing of said female joint is fitted in the first fitting hole movably in the retreating direction; and
a first valve casing biasing means for biasing said first valve casing outward is provided.

10. The coupling device according to claim 6, wherein,
the second valve casing of said male joint is fitted in the second fitting hole movably in the advancing direction;
a second valve casing biasing means for biasing said second valve casing in the retreating direction is provided; and
when a fluid pressure is supplied to said fluid pressure operation chamber while said first and second valve casings closely face each other, the second valve casing and second valve body are advanced together so that the leading ends of the first and second valve casings abut on each other and, then, the second valve body is advanced in relation to the second valve casing.

11. The coupling device according to claim 6, wherein the second valve seat of said male joint comprises an annular sealing member fitted on the leading end of the second valve casing and the annular sealing member is capable of abutting on the leading end of the first valve casing of the female joint.

12. The coupling device according to claim 6, wherein the valve body drive means is capable of advancing the second valve body so as to drive the first and second valve bodies to the opening positions and connect the female and male joints while the leading ends of the first and second valve casings abut on each other with an axes of said female and male joints being shifted within a predetermined range.

13. The coupling device according to claim 6, wherein said molding machine is a horizontal injection molding machine.

\* \* \* \* \*